United States Patent
Bashar et al.

(10) Patent No.: US 10,158,473 B2
(45) Date of Patent: Dec. 18, 2018

(54) METHODS, APPARATUSES, AND SYSTEMS FOR TRANSMITTING HYBRID AUTOMATIC REPEAT REQUEST TRANSMISSIONS USING CHANNELS IN AN UNLICENSED SHARED MEDIUM

(71) Applicant: INTEL IP CORPORATION, Santa Clara, CA (US)

(72) Inventors: Shafi Bashar, Santa Clara, CA (US); Hong He, Beijing (CN); Seunghee Han, Cupertino, CA (US); Jong-kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 102 days.

(21) Appl. No.: 14/671,872

(22) Filed: Mar. 27, 2015

(65) Prior Publication Data

US 2016/0099799 A1     Apr. 7, 2016

Related U.S. Application Data

(60) Provisional application No. 62/059,747, filed on Oct. 3, 2014.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1893* (2013.01);
(Continued)

(58) Field of Classification Search
CPC .... H04L 5/0048; H04L 5/0055; H04L 5/0053
See application file for complete search history.

(56) References Cited

U.S. PATENT DOCUMENTS

2013/0225184 A1   8/2013  Liu et al.
2013/0242817 A1*  9/2013  He ................... H04W 72/0413
                                                  370/280
(Continued)

FOREIGN PATENT DOCUMENTS

WO    WO2016/047727 A1    3/2016

OTHER PUBLICATIONS

International Search Report and Written Opinion dated Jan. 5, 2016 for International Application No. PCT/US2015/041835; 19 pages.

(Continued)

*Primary Examiner* — Derrick W Ferris
*Assistant Examiner* — Kevin H Lee
(74) *Attorney, Agent, or Firm* — Schwabe, Williamson & Wyatt, P.C.

(57) ABSTRACT

Methods, systems, and storage media for providing and/or obtaining feedback for data transmissions in an unlicensed shared medium are described. In embodiments, an apparatus may include radio control circuitry to demodulate and decode a data transmission from an evolved node B (eNB). The apparatus may include and processing circuitry, coupled with the radio control circuitry, and the processing circuitry is to receive the data transmission from the radio control circuitry and generate feedback based on the data transmission. The radio control circuitry may also control radio-frequency circuitry to determine whether a physical channel in an unlicensed shared medium is unoccupied, and transmit the feedback to the eNB over the physical channel when the physical channel is unoccupied according to the determination. Other embodiments may be described and/or claimed.

21 Claims, 8 Drawing Sheets

(51) Int. Cl.
*H04L 5/14* (2006.01)
*H04L 27/00* (2006.01)
*H04W 72/02* (2009.01)
*H04W 28/06* (2009.01)

(52) U.S. Cl.
CPC .............. *H04L 5/0007* (2013.01); *H04L 5/14* (2013.01); *H04L 27/0006* (2013.01); *H04W 72/02* (2013.01); *H04L 27/001* (2013.01); *H04W 28/06* (2013.01)

(56) References Cited

U.S. PATENT DOCUMENTS

| | | | |
|---|---|---|---|
| 2014/0112289 A1 | 4/2014 | Kim et al. | |
| 2015/0085815 A1* | 3/2015 | Li | H04L 1/1621 370/329 |
| 2016/0043854 A1* | 2/2016 | Damnjanovic | H04L 5/0048 370/329 |
| 2016/0212762 A1* | 7/2016 | Xia | H04L 5/001 |
| 2017/0164345 A1* | 6/2017 | Goto | H04W 72/0406 |

OTHER PUBLICATIONS

Partial International Search Report dated Oct. 5, 2015 from International Application No. PCT/US2015/041835, 7 pages.
LG Electronics, "Candidate solutions for LAA operations," 3GPP TSG RAN WG1 Meeting #78bis R1-144042, Agenda Item 7.3.2.3, Oct. 6-10, 2014, Ljubljana, Slovenia, 6 pages.
Intel Corporation, "On the LAA uplink: scheduling, LBT, and HARQ," 3GPP TSG RAN WG1 Meeting #80 R1-150507, Agenda Item 7.2.3.3, Feb. 9-13, 2015, Athens, Greece, 4 pages.
Dahlman et al, "Retransmission Protocols—Chapter 12," 4G LTE Advanced for Mobile Broadband, Oct. 7, 2013, Academic Press, XP055216094, 11 pages.
3GPP, "Technical Specification Group Radio Access Network; Evolved Universal Terrestrial Radio Access (E-UTRA); Physical layer procedures (Release 12)," 3GPP TS 36.213 V12.3.0 (Sep. 2014), Lte Advanced, 212 pages.
Office Action dated May 15, 2018 for Japanese Patent Application No. JP2017-517322, 12 pates.

\* cited by examiner

TABLE 1: 1 BIT TRANSMISSION

| Receiver State | Receiver Feedback (current LTE specifications) | Receiver Feedback (example embodiment) | Overhead Savings: approx. 50% |
|---|---|---|---|
| ACK | 1 | 1 | |
| NACK | 0 | X | |

TABLE 2: 2 BIT TRANSMISSION EXAMPLE 1

| Receiver State | Receiver Feedback (current LTE specifications) | Receiver Feedback (example embodiment) | Overhead Savings: approx. 25% |
|---|---|---|---|
| ACK, ACK | 1,1 | 1,1 | |
| ACK, NACK | 1,0 | 1,0 | |
| NACK, ACK | 0,1 | 0,1 | |
| NACK, NACK | 0,0 | X | |

TABLE 3: 2 BIT TRANSMISSION EXAMPLE 2

| State | Receiver Feedback (current LTE specifications) | Receiver Feedback (example embodiment) | Overhead Savings: approx. 75% |
|---|---|---|---|
| ACK, ACK | 1,1 | 1 | |
| ACK, NACK | 1,0 | X | |
| NACK, ACK | 0,1 | X | |
| NACK, NACK | 0,0 | X | |

Fig.9

METHODS, APPARATUSES, AND SYSTEMS FOR TRANSMITTING HYBRID AUTOMATIC REPEAT REQUEST TRANSMISSIONS USING CHANNELS IN AN UNLICENSED SHARED MEDIUM

RELATED APPLICATIONS

The present application claims priority under 35 U.S.C. § 119 to U.S. Provisional Application No. 62/059,747, filed on Oct. 3, 2014, which is hereby incorporated by reference in its entirety.

FIELD

Implementations of the claimed invention generally relate to the field of wireless communications, and in particular, utilizing unlicensed spectrum in Long Term Evolution (LTE) wireless communications networks.

BACKGROUND

As demand for wireless data in cellular networks increases, user expectations of high data rates along with seamless mobility also increases. In order to fulfill the increasing user expectations of high data rates and seamless mobility, more wireless network spectrum may need to be made available for wireless subscribers. Typical Long Term Evolution (LTE) wireless networks are designed to use a dedicated licensed spectrum. The spectrum in which a wireless network operator deploys a LTE network is solely used by that operator to serve that operator's wireless network subscribers. To meet the growing demand for wireless network spectrum, the 3rd Generation Partnership Project (3GPP) has proposed using radio-frequency carriers in the unlicensed spectrum, which is often referred to as "Long Term Evolution (LTE) in Unlicensed" ("LTE-U") (also referred to as Licensed-Assisted Access (LAA)). Generally, the unlicensed spectrum includes frequencies in the 5 GHz band.

The basic premise of LTE-U is to extend the LTE protocols into the unlicensed spectrum in order to supplement data traffic in the licensed spectrum. Because wireless network operators deploy their LTE systems in their corresponding licensed spectrum, data transmission and related acknowledgement feedback do not typically require any contention mechanisms. However, since the unlicensed spectrum can be shared by more than one wireless network operator, as well as other radio access technologies (for example, Wi-Fi), sharing and contention mechanisms may be required to deploy LTE in the unlicensed spectrum.

When LTE-U is used as a supplemental carrier, the aforementioned contention mechanisms can be employed to transmit downlink and/or uplink data using the unlicensed spectrum. Even though data is transmitted using the unlicensed spectrum, it is more likely that the transmission of more delay and quality of service (QoS) sensitive service (for example, hybrid automatic repeat request (HARQ)-acknowledgement (ACK) feedback), will likely be carried out using the licensed spectrum because the licensed spectrum may be considered more reliable than the unlicensed spectrum. However, as the use of the unlicensed spectrum increases, the transmission of HARQ-ACK feedback over licensed channel will likely induce significant overheads. Therefore, the use of unlicensed band for HARQ-ACK feedback transmission may be advantageous.

Moreover, several scenarios can be envisioned for the future 5G technology, where LTE will be deployed as a Stand-Alone (SA) carrier in the unlicensed band. Therefore, new mechanisms may be required to transmit HARQ-ACK information in the unlicensed band.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 9 illustrates various state tables of a receiver state showing various states of the receiver based on received feedback according to a modified feedback transmission mechanism, in accordance with various example embodiments.

DETAILED DESCRIPTION

Figure 1:
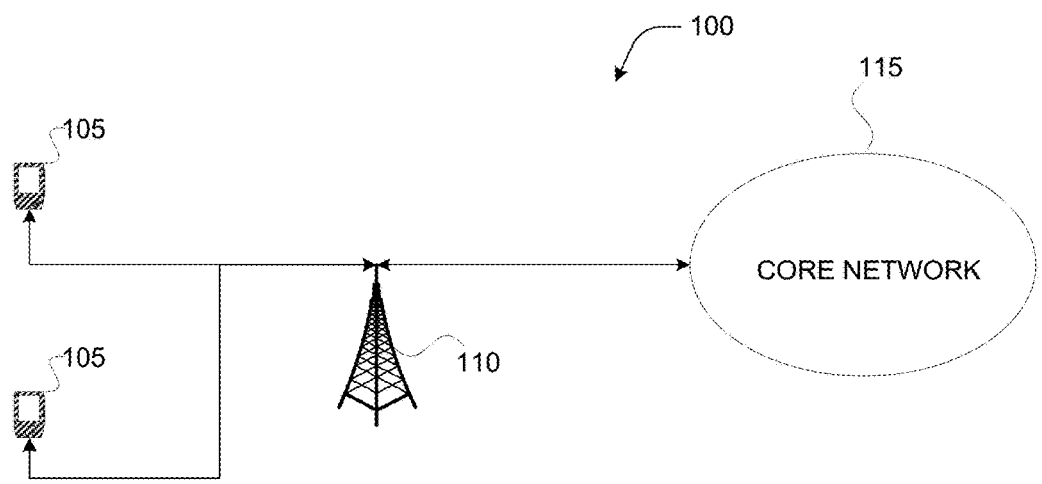
FIG. 1 illustrates a communications network in accordance with various example embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments", "in some embodiments", and the like are used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B". For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

It should be noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc. that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "user equipment" may be considered synonymous to, and may hereafter be occasionally referred to, as a client, mobile, mobile device, mobile terminal, user terminal, mobile unit, mobile station, mobile user, UE, subscriber, user, remote station, access agent, user agent, receiver, etc., and may describe a remote user of network resources in a communications network. Furthermore, the term "user equipment" may include any type of wireless/wired device such as consumer electronics devices, cellular phones, smart phones, tablet personal computers, wearable computing devices, personal digital assistants (PDAs), desktop computers, and laptop computers, for example.

As used herein, the term "network element", may be considered synonymous to and/or referred to as a networked computer, networking hardware, network equipment, router, switch, hub, bridge, radio network controller, radio access network device, gateway, and/or any other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as a Node B, an enhanced or evolved Node B (eNB), base transceiver station (BTS), access point (AP), etc. and may describe equipment that provides the radio baseband functions for data and/or voice connectivity between a network and one or more users.

It should also be noted that the term "channel" as used herein may refer to any transmission medium, either tangible or intangible, which is used to communicate data or a data stream. Additionally, the term "channel" may be synonymous with and/or equivalent to "communications channel", "data communications channel", "transmission channel", "data transmission channel", "access channel", "data access channel", "link", "data link", "carrier", "radiofrequency carrier", and/or any other like term denoting a pathway or medium through which data is communicated.

Example embodiments are generally directed towards the design of Long Term Evolution—Unlicensed (LTE-U) and Licensed-Assisted Access (LAA) as a Stand-Alone (SA) carrier in the unlicensed spectrum, and more specifically, example embodiments are directed towards new hybrid automatic repeat request (HARQ) feedback mechanisms that may be used for data transmissions in an unlicensed shared medium.

FIG. 1 illustrates an example of a communications network 100, according to an example embodiment. Communications network 100 includes user equipments (UEs) 105, e Node B (eNB) 110, and core network 115.

Referring to FIG. 1, each of the UEs 105 (collectively referred to as "UE 105") may be physical hardware devices that are capable of running one or more applications and capable of connecting with a network element (for example, BSs 110) via a wireless interface. UE 105 may include a transmitter/receiver (or alternatively, a transceiver), memory, one or more processors, and/or other like components. UE 105 may be configured to send/receive data to/from at least one of the BSs 110 (collectively referred to as "eNB 110"). UE 105 may be designed to sequentially and automatically carry out a sequence of arithmetic or logical operations; equipped to record/store digital data on a machine readable medium; and transmit and receive digital data via base station 110. UE 105 may include wireless phones or smartphones, laptop personal computers (PCs), tablet PCs, wearable computing devices, and/or any other physical or logical device capable of recording, storing, and/or transferring digital data via base station 110 and/or any other like network element. The wireless transmitter/receiver (or alternatively, a transceiver) included in the UE 105 is configured to operate in accordance with one or more wireless communications protocols and/or one or more cellular phone communications protocols. UE 105 may be configured to operate in accordance with the 3rd Generation Partnership Project (3GPP) Long Term Evolution-Advanced (LTE-A) standards and/or any other wireless communication protocols, including RF-based, optical (visible/invisible), and so forth.

In various embodiments, the UE 105 may be configured to communicate data (for example, transmit and receive) data over a licensed shared medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. Additionally, the UE 105 may be configured to perform one or more known medium-sensing operations and/or carrier-sensing operations in order to determine whether one or more channels in the unlicensed spectrum is unavailable or otherwise occupied.

Referring back to FIG. 1, eNB 110 is a hardware computing device configured to provide wireless communication services to mobile devices (for example, UE 105) within a geographic area or cell coverage area associated with eNB 110. The eNB 110 may provide wireless communication services to UE 105 via a link for each UE 105. Links between eNB 110 and a UE 105 may include one or more downlink (or forward) channels for transmitting information from eNB 110 to UE 105 and one or more uplink (or reverse) channels for transmitting information from UE 105 to the eNB 110. The channels may include the Physical Downlink Shared Channel (PDSCH), Physical Downlink Control Channel (PDCCH), Physical HARQ Indicator Channel (PHICH), Physical Control Format Indicator Channel (PCFICH), Physical Broadcast Channel (PBCH), Physical Uplink Shared Channel (PUSCH), Physical Uplink Control Channel (PUCCH), Physical Random Access Channel (PRACH), and/or any other like communications channels or links used to transmit/receive data.

In various embodiments, BSs 110 include a transmitter/receiver (or alternatively, a transceiver) connected to one or more antennas, one or more memory devices, one or more processors, and/or other like components. The one or more transmitters/receivers may be configured to transmit/receive data signals to/from one or more UEs 105 within its cell coverage area via one or more links that may be associated with a transmitter and a receiver. In various embodiments, BSs 110 may be configured to operate a channel access method, such as code division multiple access (CDMA), orthogonal frequency-division multiple access (OFDMA), frequency division multiple access (FDMA), time division multiple access (TDMA), packet mode multiple-access, space division multiple access (SDMA), and/or any other like channel access methods or combinations thereof. In various embodiments, when communications network 100 employs the LTE-A standard, eNB 110 may employ Evolved Universal Terrestrial Radio Access (E-UTRA) protocols (for example, OFDMA for downlink communications and single carrier frequency-division multiple access (SC-FDMA) for uplink communications) to connect with, or otherwise communicate with, UEs 105.

In various embodiments, eNB 110 may be configured to perform medium-sensing operations, carrier sensing operations, and/or one or more collision detection methods, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

It should be noted that eNB 110 may be part of a Radio Access Network (RAN), other Radio Access Technology (RAT), etc. that may include the eNB 110 and/or a Radio Network Controller (RNC) (not shown). In embodiments where communications network 100 employs the LTE standard, the RAN may be referred to as an evolved UMTS Terrestrial Radio Access Network (E-UTRAN). The RNC may be a hardware computing device that carries out radio resource management as well as mobility management functions in the communications network 100. To this end, the RNC may include a transmitter/receiver (or alternatively, a transceiver) connected to one or more antennas, memory, one or more processors, and/or other like components. In some embodiments, the eNB 110 and a RNC may reside on the same physical hardware device. The RNC may control the eNB 110 and may communicate (for example, transmit and receive) information to/from core network 115. RNCs and their typical functionality are generally well-known, and thus, a further detailed description of the typical functionality of RNC 115 is omitted.

Referring to FIG. 1, core network 115 may include one or more hardware devices that provide various telecommunications services to mobile devices (for example, UE 105), which may be connected to the core network 115 via a base station (for example, eNB 110). In embodiments where communications network 100 employs the LTE protocol, core network 115 may comprise components of the System Architecture Evolution (SAE) with an Evolved Packet Core (EPC) as described by 3GPP Technical Specifications. In such embodiments, core network 115 may include components such as a Mobility Management Entity (MME), Serving Gateway (SGW), Packet Data Network (PDN) Gateway (PGW), Home Subscriber Server (HSS), Access Network Discovery and Selection Function (ANDSF), Evolved Packet Data Gateway (ePDG), and/or other like components as are known. Because the components of the SAE core network and their functionality are generally well-known, a further detailed description of the SAE core network is omitted. It should also be noted that the aforementioned functions may be provided by the same physical hardware device or by separate components and/or devices.

In various embodiments, the UEs 105 and the eNB may be configured to operate in accordance with the automatic repeat request (ARQ) or hybrid ARQ (HARQ) protocols such that UEs 105 may transmit feedback or a feedback message/signal in response to receiving a data transmission from the eNB 110. For example, a data transmission may be carried by transport blocks that may be sent over a downlink physical data channel (for example, the PDSCH). Scheduling information of the data transmission, including its resource allocation in one or more subframes and its modulation and coding scheme, may be included in a physical control channel (for example, the PDCCH). Generally, the UE 105 may decode the messages in the physical control channel and if the UE 105 determines that it has been assigned to a physical data channel, the UE 105 will decode the data transmission according to the scheduling information decoded from the physical control channel. The feedback may be in the form of a HARQ-acknowledgement (ACK) message or a HARQ-negative acknowledgement (NACK) message. The UE 105 may transmit the HARQ-ACK message in response to properly decoding and/or demodulating the data transmission received from the eNB 110 over the physical data channel. The HARQ-ACK message may indicate to the eNB that a next scheduled data transmission may be transmitted to the UE 105 over the same physical data channel or a different physical data channel. The UE 105 may transmit the HARQ-NACK message in response to an improper or unsuccessful decoding and/or demodulating of the data transmission received from the eNB 110 over the physical data channel. The HARQ-NACK message may indicate to the eNB 110 that the previously transmitted data transmission should be retransmitted to the UE 105 over the same or different physical data channel. The UEs 105 may transmit the feedback in an uplink transmission that includes the HARQ-ACK/NACK, when the received data transmission is successfully/unsuccessfully decoded. According to various embodiments, the UE 105 may transmit the feedback over a physical control channel (e.g. the PUCCH) or a physical data channel (for example, the PUSCH). In embodiments when the UE 105 transmits data through the PUSCH, the UE 105 may encode or otherwise embedded the ACK/NACK information into the PUSCH transmission, or the UE 105 may encode or otherwise embedded the ACK/NACK information into a separate ACK/NACK feedback message that the UE 105 transmits over the PUCCH.

Although FIG. 1 shows a single base station (for example, eNB 110) serving two mobile devices (for example, UEs 105), it should be noted that in various example embodiments, communications network 100 may include many more base stations serving many more user terminals than those shown in FIG. 1. Additionally, it should be noted that multiple base stations may be included in one RAN or RAT (not shown). It should also be noted that communications network 100 may include many more network devices as defined by the LTE standard and/or any other like wireless communications standard. However, it is not necessary that all of these generally conventional components be shown in order to understand the example embodiments as described herein.

Figure 2:
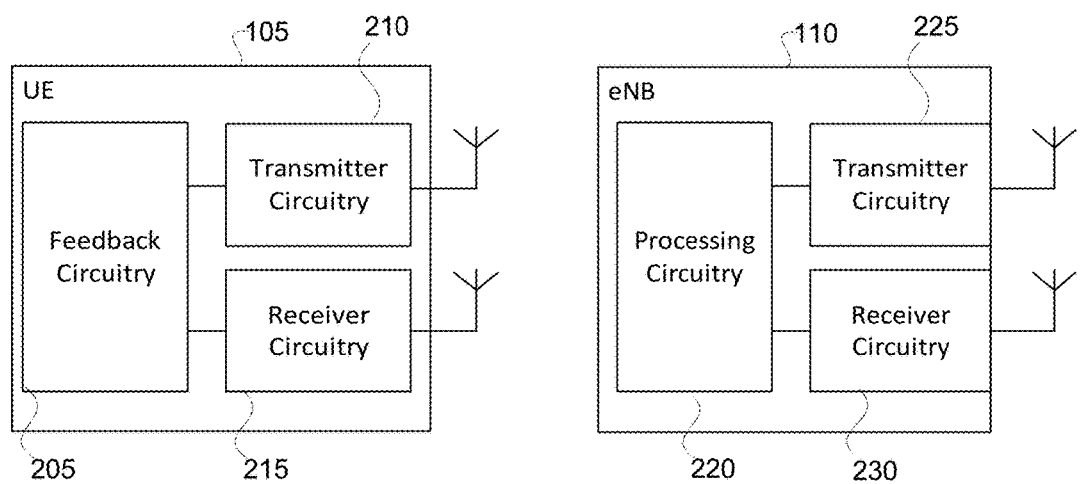
FIG. 2 illustrates the components of a user equipment (UE) and an evolved Node B (eNB) in accordance with various example embodiments.

FIG. 2 illustrates the components of UE 105 and eNB 110 that may be employed by communications networks 100, in accordance with various example embodiments. As shown, the UE 105 includes feedback circuitry 205, transmitter circuitry 210, and receiver circuitry 215. Additionally, eNB 110 includes processing circuitry 220, transmitter circuitry 225, and receiver circuitry 230.

According to various embodiments, the transmitter circuitry 210 and the receiver circuitry 215 may be coupled with one or more antennas to facilitate over-the-air transmissions with, for example, the eNB 110. For example, the transmitter circuitry 210 may be configured to receive digital data from one or more components of UE 105, and convert the received digital data into an analog signal for transmission over an air interface by way of the one or more antennas. The receiver circuitry 215 may be any type of hardware device that can receive and convert a signal from a modulated radio wave into usable information, such as digital data. Receiver circuitry 215 may be coupled with the one or more antennas in order to capture the radio waves. Receiver circuitry 215 may be configured to send digital data converted from a captured radio wave to one or more other components of the UE 105. In embodiments, the UE the transmitter circuitry 210 and the receiver circuitry 215 may be coupled to the feedback circuitry 205. It should be noted that according to various embodiments, the feedback circuitry 205 may also be referred to as processing circuitry 205. The feedback circuitry 205 may be configured to perform feedback operations described herein with respect to the UE 105. The components of the UE 105 circuitry may be configured to perform operations similar to those described elsewhere in the present disclosure with respect to a UE 105. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules in combination with one or more hardware devices.

According to various embodiments, the eNB 110 circuitry may include transmitter circuitry 225 and receiver circuitry 230 coupled to processing circuitry 220. The transmitter circuitry 225 and the receiver circuitry 230 may be the same or similar to the transmitter circuitry 210 and the receiver circuitry 215 as described with regard to UE 105, or the transmitter circuitry 225 and the receiver circuitry 230 may operate in a same or similar fashion as described with regard to the transmitter circuitry 210 and the receiver circuitry 215 of the UE 105. The transmitter circuitry 225 and receiver circuitry 230 may be coupled with one or more antennas to provide over the air communications with, for example, the UE 105. The eNB 110 may be configured to communicate over a backhaul communication link with other network entities such as, for example, entities within an evolved packet core (EPC) of a wireless communications system (for example, entities within the core network 115). The processing circuitry 220 may control and/or schedule the transmission of data to/from the UE 105 in accordance with the various example embodiments described herein. The components of the eNB 110 circuitry may be configured to perform operations similar to those described elsewhere in this disclosure with respect to the eNB 110. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules in combination with one or more hardware devices.

Figure 3:
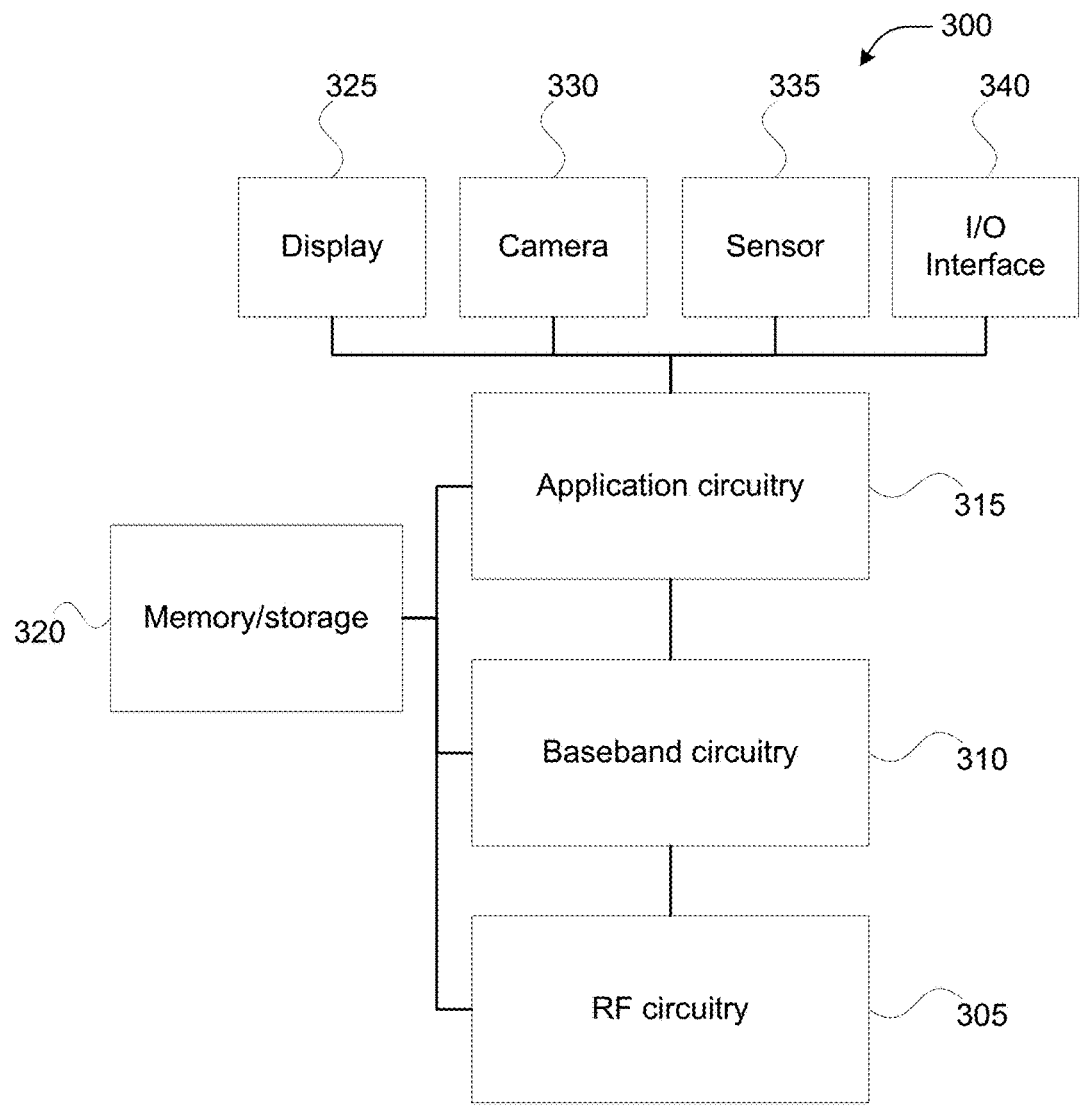
FIG. 3 illustrates the components of a computing system that may implement the example embodiments disclosed herein, in accordance with various example embodiments.

FIG. 3 illustrates the components of a computing system 300 that may implement the example embodiments disclosed herein, in accordance with various example embodiments. Although FIG. 3 illustrates various components of the computing system 300, the embodiments described herein may be implemented into a system using any suitably configured hardware and/or software. FIG. 3 illustrates, for one example embodiment, computing system 300 comprising radio frequency (RF) circuitry 305, baseband circuitry 310, application circuitry 315, memory/storage 320, display 325, camera 330, sensor 335, and input/output (I/O) interface 340, coupled with each other at least as shown by FIG. 3.

The application circuitry 315 may include circuitry such as, but not limited to, one or more single-core or multi-core processors. The processor(s) may include any combination of general-purpose processors and dedicated processors (for example, graphics processors, application processors, etc.). The processors may be coupled with memory/storage 320 and configured to execute instructions stored in the memory/storage 320 to enable various applications and/or operating systems running on the system.

Memory/storage 320 may be a hardware device configured to store an operating system and program code for one or more software components, such as program code for performing operations for carrying out the various example embodiments described herein. Memory/storage 320 may be used to load and store data and/or instructions. Memory/storage for one embodiment may include any combination of suitable volatile memory (for example, dynamic random access memory (DRAM)) and/or non-volatile memory (for example, flash memory). The program code and/or software components may also be loaded from a separate computer readable storage medium into memory/storage 320 using a drive mechanism (not shown). Such separate computer readable storage medium may include a memory card, memory stick, removable flash drive, sim card, CD-ROM/DVD disc, and/or other like computer readable storage medium (not shown). In some embodiments, software components may be loaded into memory/storage 320 from an external device or system via I/O interface 340.

The baseband circuitry 310 may include circuitry such as, but not limited to, one or more single-core or multi-core processors. The processor(s) may include a baseband processor. The baseband circuitry may handle various radio control functions that enables communication with one or more radio networks via the RF circuitry 305. It should be noted that in various embodiments, the base band circuitry may include radio control circuitry or otherwise operate radio control circuitry to perform the various radio control functions. In various embodiments, the radio control circuitry may utilize the baseband processor to perform at least some of the radio control functions. The radio control functions may include, but are not limited to, signal modulation, encoding, decoding, radio frequency shifting, etc. In some embodiments, the baseband circuitry 310 may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 310 is configured to support radio communications of more than one wireless protocol may be referred to as multi-mode baseband circuitry. In various embodiments, baseband circuitry 310 may include circuitry to operate with signals that are not strictly considered as being in a baseband frequency. For example, in some embodiments, baseband circuitry 310 may include circuitry to operate with signals having an intermediate frequency, which is between a baseband frequency and a radio frequency.

RF circuitry 305 may enable communication with wireless networks using modulated electromagnetic radiation through a non-solid medium. In various embodiments, the RF circuitry 305 may include switches, filters, amplifiers, etc. to facilitate the communication with the wireless network. In various embodiments, RF circuitry 305 may include circuitry to operate with signals that are not strictly considered as being in a radio frequency. For example, in some embodiments, RF circuitry 305 may include circuitry to operate with signals having an intermediate frequency, which is between a baseband frequency and a radio frequency.

In various embodiments, the transmitter circuitry, processing circuitry, or receiver circuitry discussed above with respect to the UE 105 or eNB 110 may be embodied in whole or in part in one or more of the RF circuitry 305, the baseband circuitry 310, and/or the application circuitry 315. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 310, the application circuitry 315, and/or the memory/storage 320 may be implemented together on a system on a chip (SOC).

In various embodiments, the I/O interface 340 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 335 may include one or more sensing devices to determine environmental conditions and/or location information related to the system. In some embodiments, the sensors 335 may include, but are not limited to, a gyro sensor, an accelerometer, a proximity sensor, an ambient light sensor, and a positioning unit. The positioning unit may also be part of, or interact with, the baseband circuitry 310 and/or RF circuitry 305 to communicate with components of a positioning network (for example, a global positioning system (GPS) satellite).

In various embodiments, the display 325 may include a display (for example, a liquid crystal display, a touch screen display, etc.).

In various embodiments, the computing system 300 may be a mobile computing device such as, but not limited to, a laptop computing device, a tablet computing device, a netbook, an ultrabook, a smartphone, a wearable computing device, etc. In various embodiments, computing system 300 may have more or less components, and/or different architectures.

Figure 4:
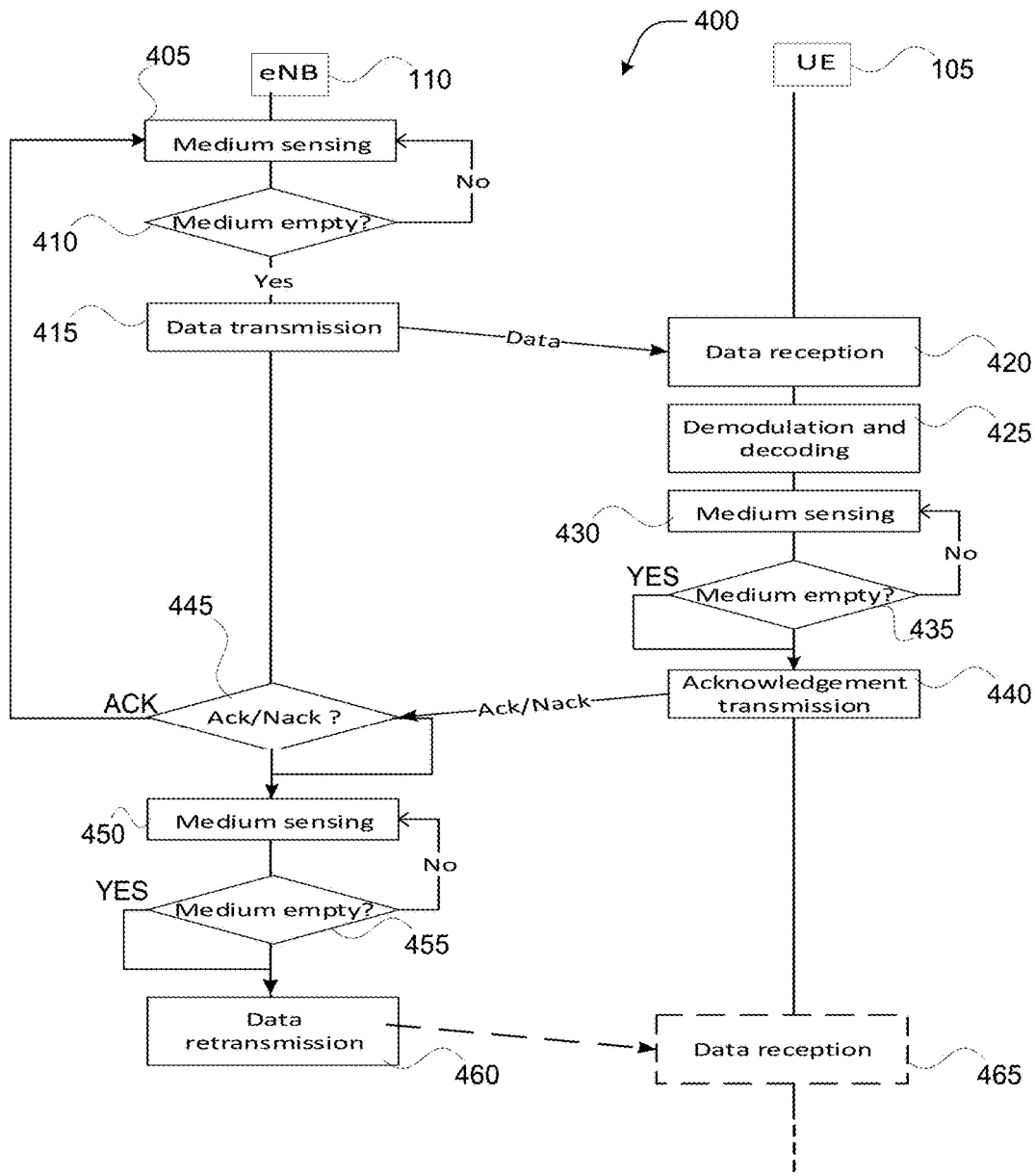
FIG. 4 illustrates actions taken by the devices of the communications network of FIG. 1, in accordance with various example embodiments.

FIG. 4 illustrates a process 400 that shows the actions taken by the devices of the communications network of FIG. 1, in accordance with various example embodiments. According to various embodiments, the process 400 may be used to provide feedback for a data transmission that is communicated over an unlicensed shared medium. For illustrative purposes, the operations of process 400 will be described as being performed by the UE 105 and the eNB 110, which are described with respect to FIGS. 1-3. However, it should be noted that other similar devices may operate the process 400 as described below. While particular examples and orders of operations are illustrated in FIG. 4, in various embodiments, these operations may be re-ordered, broken into additional operations, combined, and/or omitted altogether.

Referring to FIG. 4, at operation 405 the eNB 110 may perform a medium-sensing operation. In various embodiments, in order to ensure the reliability of a reception of feedback bits, such as HARQ-ACK bits, a channel sensing mechanism may be employed to determine an empty and/or unoccupied channel before transmitting the feedback in the unlicensed band. This may be referred to as a "listen-before-talk" (LBT) contention mechanism. It should be noted that the term "medium sensing" may also be referred to as "carrier sensing", "channel sensing", LBT, and the like. In order to ensure reliable reception of the feedback data (for example, HARQ-ACK, HARQ-NACK, etc.), as well as reducing collisions with transmission from other RATs and/or Wi-Fi devices operating in the 5 GHz band, the UE 110 first senses the medium. It should be noted that FIG. 4 illustrates one possible embodiment of this mechanism, and according to various embodiments, the eNB 110 may perform a medium-sensing operation over multiple unlicensed channels to detect or otherwise determine an empty channel in an unlicensed shared medium.

At operation 410, the eNB 110 determines whether the medium is empty. If the eNB 110 determines that the medium is not empty (for example, that a channel of the unlicensed spectrum is occupied), then the eNB 110 proceeds back to operation 405 to perform the medium-sensing operation for one or more other channels in the unlicensed spectrum that may be unoccupied. If the eNB 110 determines that the medium is empty or unoccupied, then the eNB 110 proceeds to operation 415 to transmit a data transmission to the UE 105 over the detected channel in the unlicensed spectrum.

At operation 420, the UE 105 receives the data transmission from the eNB 110. At operation 425, the UE 105 performs demodulation and/or decoding operations. Many methods for demodulating and/or decoding data transmissions are generally well-known, and thus, a further detailed description of the methods for demodulating and/or decoding data transmissions is omitted.

At operation 430, the UE 105 performs a medium-sensing operation. The medium-sensing operation performed by the UE 105 may be the same or similar to the medium-sensing operation described previously with regard to operation 405. If the UE 105 determines that the medium is not empty (for example, that a channel of the medium is occupied), then the UE 105 proceeds back to operation 430 to perform the medium-sensing operation for one or more other channels in the unlicensed spectrum that may be unoccupied. If the UE 105 determines that the medium is empty or unoccupied, then the UE 105 proceeds to operations 340 to transmit a feedback (for example, HARQ-ACK, HARQ-NACK, etc.) associated with the data transmission to the eNB 110.

In various embodiments, once the UE 105 detects or otherwise determines an empty channel on the unlicensed spectrum, it will transmit feedback information over it. The empty channel may be the same channel in which the UE 105 received the data transmission from the eNB 110, or the UE 105 may use an empty channel that is different than the channel in which the UE 105 received the data transmission from the eNB 110. For example, in various embodiments, the UE 105 may use the PUCCH or the PUSCH to transmit HARQ-ACK/NACK feedback. In most communications networks that employ the LTE-A standard, a PUCCH transmission is usually only allowed on a primary cell (PCell) and a secondary cell (SCell) for a dual connectivity scenario. However, in case of SA LTE-U operation, PUCCH transmissions can be extended to other carriers as well. In various embodiments, M number of PUCCH channels that operate on different carriers in the unlicensed band may be semi-statically configured by a higher layer signaling for each LTE-U capable UEs (for example, UEs 105). For transmission of HARQ-ACK/NACK feedback, the UE 105 selects one available PUCCH channel from the M number of PUCCH channels that may be detected according to the medium/carrier sensing operation. Additionally, in various embodiments, the eNB 110 may dynamically configure the number of M values that each of the UEs 105 may use for selecting the PUCCH channels. Furthermore, it should be noted that in various embodiments, the UE 105 may also detect or otherwise determine an empty channel for transmitting feedback on an unlicensed band that is different than the unlicensed band that was used by the eNB 110 to transmit the data transmission.

Referring back to FIG. 4, at operation 445 the eNB 110 receives the feedback message from the UE 105 and determines whether the feedback is one of a HARQ-ACK message or a HARQ-NACK message. If at operation 445, the eNB 110 determines that the feedback is a HARQ-ACK message, then eNB 110 proceeds back to operation 405 to perform a medium-sensing operation for transmission of a new data transmission. If at operation 445, the eNB 110 determines that the feedback is a HARQ-NACK message or a discontinuous transmission (DTX) message, then eNB 110 proceeds to operation 450 to perform a medium-sensing operation. The medium-sensing operation may be the same or similar as the medium-sensing operation performed at operations 405 and 430. At operation 455, the eNB 110 determines whether the medium is empty. If the eNB 110 determines that the medium is not empty (for example, that a channel of the medium is occupied), then the eNB 110 proceeds back to operation 450 to perform the medium-sensing operation for one or more other channels in the unlicensed spectrum that may be unoccupied. If the eNB 110 determines that the medium is empty or unoccupied, then the eNB 110 proceeds to operation 460 to retransmit the data transmission to the UE 105 over the detected channel in the unlicensed spectrum. At operation 465 the UE 105 receives the data retransmission from the eNB 110.

Figure 5:
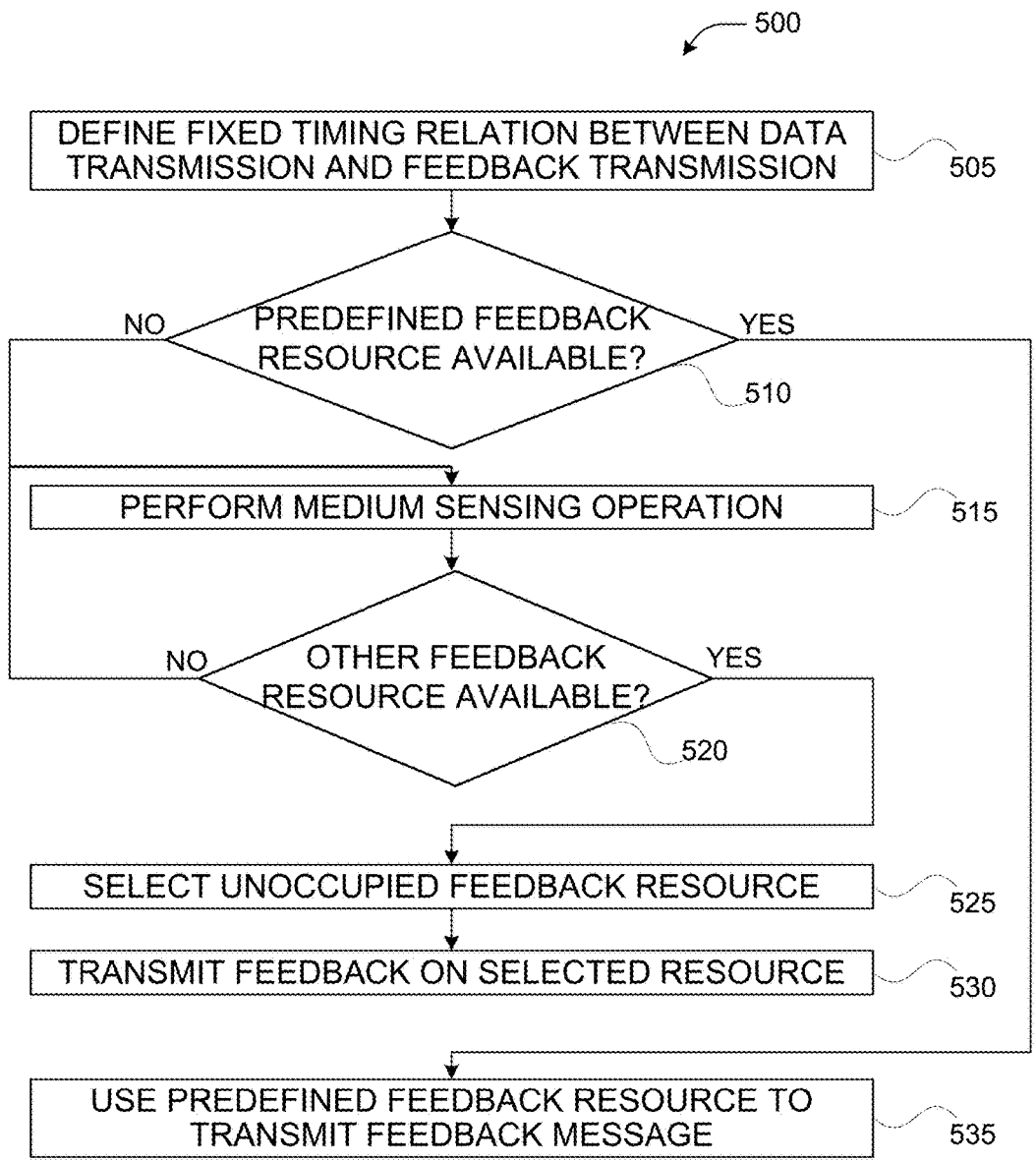
FIG. 5 illustrates a process 500 for flexible feedback timing mechanism, in accordance with various example embodiments.

FIG. 5 illustrates a process 500 for flexible feedback timing mechanism, in accordance with various example embodiments. For illustrative purposes, the operations of process 500 will be described as being performed by the UE 105, which is described with respect to FIGS. 1-3. However, it should be noted that other similar devices may operate the process 500 as described below. While particular examples and orders of operations are illustrated in FIG. 5, in various embodiments, these operations may be re-ordered, broken into additional operations, combined, and/or omitted altogether.

It should be noted that employing a channel-sensing mechanism before transmitting the feedback information alone may not be sufficient to ensure latency requirements delineated by the 3GPP for LTE-A feedback transmissions on carriers in the unlicensed band. For instance, the unlicensed shared medium may be busy for a relatively long time, and thus, a timely feedback transmission may not be sent by a UE. Accordingly, various embodiments provide for additional modifications to the existing LTE feedback mechanisms in addition to the introduction of the LBT mechanism. According to at least one embodiment, process 500 provides a flexible HARQ-ACK feedback timing mechanism to ensure the aforementioned latency requirements.

Referring to FIG. 5, at operation 505 the UE 105 may define a fixed timing relation between a data transmission and a feedback transmission. In many LTE systems, in order to ensure reduced latency for receiving feedback transmissions at a base station, a timing relation between the reception of a data transmission and a transmit time for a feedback transmission is made as short as possible while also considering tradeoffs between latency and receiver processing complexity. For data transmission that occur in the licensed spectrum, a fixed timing relation between the reception of data transmissions in a downlink channel and transmission of corresponding feedback messages in an uplink channel (or vice versa) is delineated by the current LTE standards. For example, in LTE systems employing a frequency-division duplexing (FDD) (also referred to as a "FDD deployment"), when a data transmission is transmitted on a downlink (for example, PDSCH) subframe n by a base station (for example, eNB 110), a user equipment (for example, UE 105) transmits HARQ-ACK/NACK transmission on corresponding n+4 uplink (for example, PUCCH, PUSCH, etc.) subframe. In LTE systems employing a time-division duplexing (TDD) (also referred to as a "TDD deployment"), when a data transmission is transmitted on a downlink (for example, PDSCH) subframe n by a base station (for example, eNB 110), a user equipment (for example, UE 105) transmits HARQ-ACK/NACK transmission on corresponding uplink (for example, PUCCH, PUSCH, etc.) subframe n+k, where the value of k is predefined value, for example, as defined in 3GPP's technical specification (TS) 36.213. The time period between the reception of a data transmission and the transmission of a feedback message may be referred to as a "transmission window." Since the timing relation between the reception of a data transmission over the PDSCH and the transmit time for the corresponding HARQ-ACK/NACK transmission is fixed (for example, a "fixed transmission window") for transmission in the licensed spectrum, the base station may already know of the corresponding uplink channel on which the HARQ-ACK/NACK is intended. Because in most LTE-A systems each subframe is 1 millisecond (ms) and/or 2 resource blocks (RBs) long, the fixed transmission window for TDD deployments is 4 ms and/or 8 RBs long and the fixed transmission window for FDD deployments is k ms and/or (2*k) RBs long.

Therefore, at operation 505, the UE 105 determines the fixed timing relation between the data transmission and the feedback transmission, such as n to n+4 for FDD deployments and n to n+k for TDD deployments, in order to determine whether it is feasible to transmit the feedback using the fixed transmission window.

At operation 510, the UE 105 may determine whether the predefined feedback resource is available for transmitting the feedback transmission. In various embodiments, the predefined feedback resource may be a subframe or RB for which a feedback is intended to be transmitted on (for example, the n+k subframe for TDD deployments or the n+4 subframe for FDD deployments). In order to determine whether the predetermined feedback resource is available, in various embodiments, the UE 105 may perform various signaling operations with the eNB 110 in order to determine if another transmission is scheduled to be transmitted using the predefined resource. In various embodiments, the UE 105 may perform a medium-sensing operation in order to determine if another transmission is scheduled to be transmitted using the predefined resource in order to determine whether the predetermined feedback resource is available or not. If at operation 510 the UE 105 determines that the predefined feedback resource is available or unoccupied, then the UE 105 may proceed to operation 535 to transmit the feedback transmission using the predefined feedback resource. If at operation 510 the UE determines that the predefined feedback resource is not available or is otherwise occupied, then the UE 105 may proceed to operation 515 to perform a medium-sensing operation to detect an unoccupied feedback resource for transmitting the feedback transmission.

At operation 515, the UE 105 may perform the medium-sensing operation. The medium-sensing operation may be the same or similar as the medium-sensing operation as previously discussed herein. It should be noted that, when utilizing the unlicensed spectrum, the timing relationship between data transmissions transmitted over the PDSCH and the corresponding HARQ-ACK/NACK feedback may not be guaranteed due to the potential of collisions and/or interruptions caused by other data packets. Therefore, when utilizing the unlicensed spectrum, a base station may not receive the HARQ-ACK/NACK feedback for which a PDSCH data transmission is intended. Accordingly, in various example embodiments, an expanding transmission window (also referred to as a "flexible transmission window") is introduced. Therefore, if the predefined feedback resource is unavailable, instead of using the fixed timing relation between the data transmission and the corresponding HARQ-ACK feedback, a flexible timing relation between data and the associated HARQ-ACK feedback may be used. According to various embodiments, for a data transmission on subframe n, the corresponding feedback can be transmitted on an uplink subframe n+4±l for FDD deployments, and on subframe n+k±l for TDD deployments. The value of k is pre-defined in, for example, TS 36.213. The value of l is an integer number (for example, 0, 1, 2, . . . , etc.). Thus, when a HARQ-ACK/NACK feedback transmission is transmitted on an unlicensed band, in various embodiments the eNB 110 will look for or otherwise detect the feedback transmission within a range of subframes, such as from n to n+4±l for FDD deployments and from n to n+k±l for TDD deployments, instead of just looking for one subframe (for example, the predefined feedback resource). In various embodiments, the range or value of l could be predefined at the eNB 110, whereby l is selected by a wireless network operator according to one or more design choices and/or based on one or more empirical studies. In other embodiments, the value of l may be chosen or otherwise determined by the UE 105 (for example, as discussed with regard to operation 525) and communicated to the eNB 110 using higher layer signaling than the transmission of the feedback.

Referring back to FIG. 5, at operation 520 the UE 105 may determine whether another feedback resource is available for transmitting the feedback transmission. If at operation 520 the UE determines that the other feedback resource is not available, then the UE 105 proceeds back to operation 515 to perform the medium-sensing operation to detect another unoccupied feedback resource in the unlicensed spectrum. If at operation 510 the UE determines that other feedback resources are available, then the UE 105 proceeds to operation 525 to select an unoccupied one of the available feedback resources.

At operation 525, the UE 105 may select an unoccupied feedback resource for transmitting the feedback transmission. Because the UE 105 may have to perform multiple medium-sensing operations at operation 520, in various embodiments the UE 105 may start a HARQ-ACK/NACK feedback timer once the HARQ-ACK/NACK feedback is not transmitted according to the fixed timing relation or fixed transmission window. The HARQ-ACK/NACK feedback timer may expire once the UE 105 selects a feedback resource for transmitting the feedback. Once the HARQ-ACK/NACK feedback timer expires, the UE 105 may discard the suspending HARQ-ACK/NACK information. Correspondingly, the eNB 110 may perform HARQ-ACK/NACK/DTX detection within a range of uplink subframes, where the range of uplink subframes is based on the HARQ-ACK/NACK feedback timer length at the UE 105. The HARQ-ACK/NACK feedback timer length may be communicated to the eNB 110 using higher layer signaling than the transmission of the feedback. The eNB 110 may then reconfigure semi-static resources (for example, carrier index, band number, and/or different power control parameters) for the HARQ-ACK/NACK feedback for the UE 105. At operation 530, the UE 105 may transmit the feedback on the selected resource.

Figure 6:
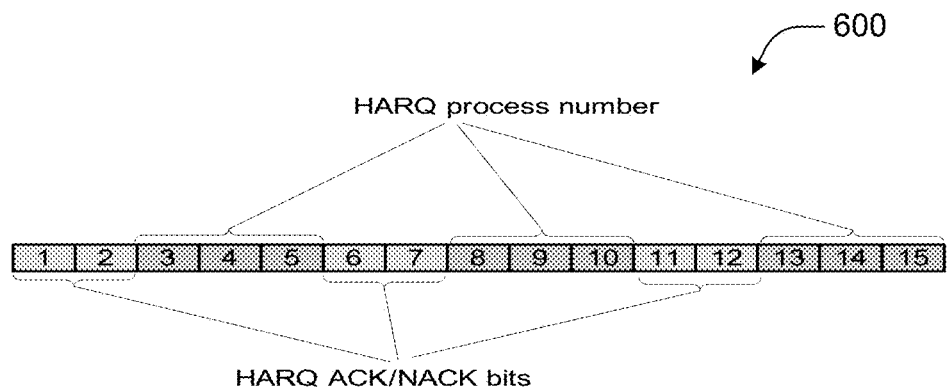
FIG. 6 illustrates a feedback message including multiplexed HARQ process numbers (HPN) along with ACK/NACK bits, in accordance with various example embodiments.
Figure 7:
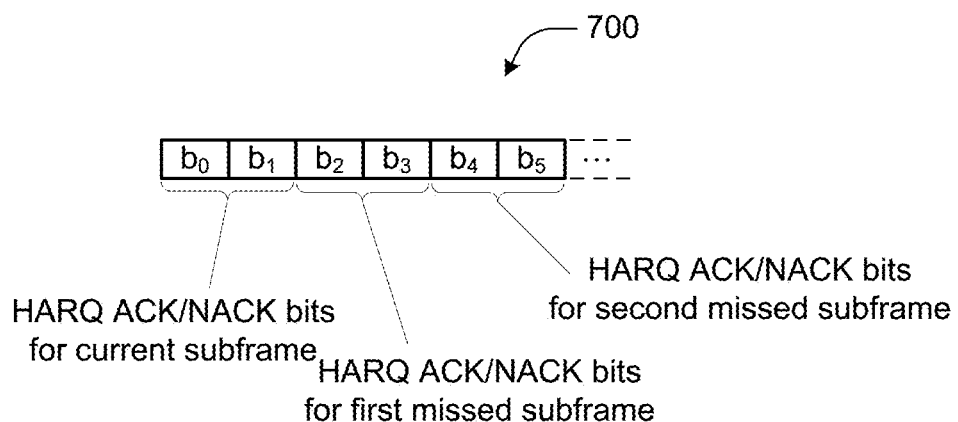
FIG. 7 illustrates an implicit representation of HPNs by fixing the HARQ ACK/NACK position for different HPNs, in accordance with various example embodiments.

FIG. 6 illustrates a feedback message 600 including multiplexed HARQ process numbers (HPNs) along with ACK/NACK bits, in accordance with various example embodiments. FIG. 7 illustrates an implicit representation of HPNs by fixing the HARQ ACK/NACK position for different HPNs, in accordance with various example embodiments.

According to various embodiments, the flexible timing relation as discussed with regard to FIG. 5 may cause ambiguity and/or potential PUCCH resource collision between different HARQ processes at the eNB 110. In order to resolve this issue, various example embodiments provide that the HARQ-ACK/NACK bits associated with one or more HARQ Process Numbers (HPNs) may be multiplexed with the HPNs, such that the ACK/NACK bits and the HPNs may be combined into a single message and transmitted on an available uplink subframe.

The HPNs associated with one or more ACK/NACK bits may indicate a HARQ process to be used for decoding the ACK/NACK bits and/or an order in which to process the ACK/NACK bits. According to most LTE specifications, uplink and downlink HARQ-ACK/NACK feedback messages should only contain ACK/NACK bits. However, in various embodiments when the fixed timing relationship between the downlink (for example, PDSCH) and HARQ-ACK/NACK feedback is not guaranteed due to potential collisions or potential interruptions by other packets in the unlicensed band, there may be confusion on HARQ-ACK/NACK feedback for which a data transmission is intended.

According to various embodiments, by multiplexing the HPNs along with ACK/NACK bits, such ambiguity may be resolved. FIG. 6 shows one example embodiment of a multiplexed feedback message that includes the HPNs along with ACK/NACK bits. In the example embodiment shown by FIG. 6, a 3-bit process number is used for FDD deployments. In embodiments having a TDD deployment, a 4-bit HPN can be used. As shown in FIG. 6, the HPNs may be added after the ACK/NACK bits. However, in various embodiments, the HPNs can precede the ACK/NACK bits. From these HPN bits, the eNB 110 may determine the HARQ process number. Furthermore, in various embodiments, the modified bit patterns including HPNs may use the PUCCH format 3 or use another format. It should be noted that multiplexing the HPNs along with ACK/NACK bits may allow for the transmission of a flexible number of ACK/NACK bits in each feedback message, where the number of bits transmitted in a particular feedback transmission (for example, a PUCCH transmission or a PUSCH transmission) can be determined implicitly from the number of missed feedback transmission opportunities (for example, a number of times that the UE 105 was unable to transmit feedback due to an occupied channel and/or subframe in the unlicensed spectrum).

In another example embodiment shown by FIG. 7, instead of transmitting the HPNs to the eNB 110, the HPNs of a transmitted ACK/NACK can be calculated or otherwise determined at the eNB 110 by fixing the position of each HBN bit within the feedback transmission message. In such embodiments, the UE 105 may not have to transmit the HBNs to the eNB 110.

Figure 8:
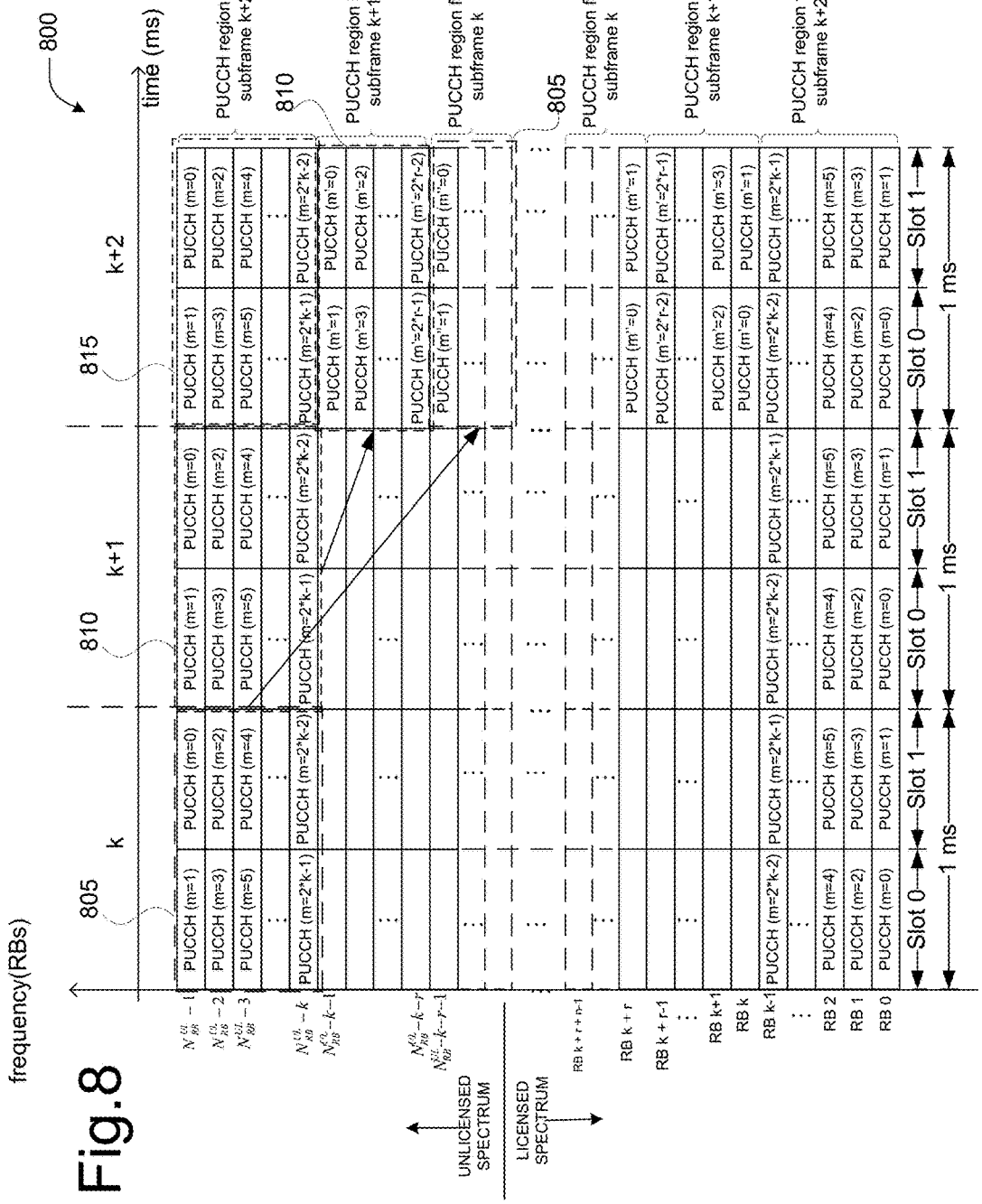
FIG. 8 illustrates a timing diagram for transmission of delayed feedback at different subframe location, in accordance with various example embodiments.

FIG. 8 illustrates a timing diagram 800 for transmission of delayed feedback at different subframe locations, in accordance with various example embodiments.

As noted previously, introducing the flexible transmission window mechanism may introduce ambiguity in distinguishing between the different HARQ processes at the eNB 110. In order to reduce this ambiguity, the transmission of delayed or flexible HARQ-ACK/NACK feedback at a different resource block (RB) location than the intended RB location as delineated by the fixed transmission window mechanism. The example embodiment illustrated by timing diagram 800 illustrates the transmission of delayed HARQ-ACK/NACK feedback at a different positions on a new subframe. For example, if the PUCCH transmission is used for HARQ-ACK feedback (as is illustrated be FIG. 8), and the HARQ-ACK/NACK feedback intended for a downlink transmission on a subframe, it may not be possible to transmit the HARQ-ACK/NACK feedback on the intended subframe due to lack of transmission opportunity. In this case, the HARQ-ACK/NACK feedback can be transmitted at a next earliest transmission opportunity of a later uplink subframe. The PUCCH resources transmission may be determined by either explicit signaling by the UE 105 or implicitly by the eNB 110 (for example, as a function of a first control channel element (CCE) index in case of PUCCH format 1a or format 1b). Uplink (for example, PUCCH) resources that are mapped to a first HARQ-ACK/NACK feedback intended for a first downlink (for example, PDSCH) transmission at a predefined first subframe may be occupied by a second HARQ-ACK/NACK feedback intended for a second PDSCH transmission at the predefined first subframe. Since the mapped PUCCH resources may be not available for the first HARQ-ACK/NACK feedback transmission, a transmission of the first HARQ-ACK/NACK feedback transmission may be delayed. According to various embodiments, a new PUCCH region may be defined for the delayed HARQ-ACK/NACK feedback.

Referring to FIG. 8, the timing diagram 800 shows subframe k, subframe k+1, and subframe k+2, each of which is 1 milliseconds (ms) long. Each subframe k, k+1, and k+2 includes 2 slots, where each slot is 0.5 ms. Each slot includes 1 resource block (RB) and each subframe includes 2 RBs. The RBs in the licensed spectrum may be labeled as RB0, RB1, RB2, . . . RBk+r+n−1, and the RBs in the unlicensed spectrum may be labeled as $N_{RB}^{UL}$−k−1 . . . $N_{RB}^{UL}$−1. Each RB lists a portion of a feedback scheduled to be transmitted during the subframe (for example, "PUCCH (m=1)"). Furthermore, it should be noted that the subframes of timing diagram 800 may be included in a type 1 frame for FDD deployments or a type 2 frame for TDD deployments.

According to the embodiment illustrated by timing diagram 800, the unlicensed medium is busy during subframe k and subframe k+1. Therefore, uplink transmission of feedback 805 may not be possible in subframe k and uplink transmission of feedback 810 may not be possible in subframe k+1. However, in subframe k+2, the unlicensed medium is empty and the UE 105 has an opportunity to perform uplink transmission for feedback 805 and feedback 810. Therefore, the feedback transmissions for feedback 805 and feedback 810 intended to be transmitted during subframe k and subframe k+1, respectively, may both be transmitted in subframe k+2. However, subframe k+2 has its own associated feedback 815 scheduled for transmission in the reserved PUCCH region as shown in FIG. 8. Therefore the feedback 805 and the feedback 810 that are delayed from being transmitted during subframe k and subframe k+1, respectively, cannot be transmitted in the reserved PUCCH resource position for feedback 815 in subframe k+2. In order to transmit feedback 805 and feedback 810 during subframe k+2, a new PUCCH resource offset may be introduced. The PUCCH region from subframe k and k+1 can be shifted to start from a different RB position or a PUCCH resource index in subframe k+2 as shown in FIG. 8. For example, if a PUCCH resource is to be transmitted on resource m in subframe k+1 and in subframe k+2, the resource position will be shifted by a resource offset. In the example embodiment shown by FIG. 8, the new resource index for feedback associated with subframe k+1 is m'=m+l and the new resource index for feedback associated with subframe k+2 is m"=m+l+r. The offset values l and r and the number of additional subframes that may be allocated to feedback transmissions can be signaled using higher layer signaling than the signaling used for transmitting the feedback.

FIG. 9 illustrates various state tables of a receiver state showing various states of the receiver based on received feedback according to a modified feedback transmission mechanism, in accordance with various example embodiments. The modified feedback transmission mechanism shown by FIG. 9 may be referred to as a "default NACK mode" for feedback transmission.

As noted previously, in most LTE systems, feedback messages may be transmitted in response to both a proper decoding and/or demodulation of a data transmission (for example, ACK) and an improper decoding and/or demodulation of a data transmission (for example, NACK). Since, timely and reliable transmission of acknowledgement signal in unlicensed band may not be possible, as an alternative to transmitting both ACK and NACK feedback, according to various example embodiments, a default NACK state can be used to reduce a number of feedback transmissions made by the UE 105. In such embodiments, if a received signal or data transmission is not decoded correctly (for example, NACK state), then the UE 105 will refrain from transmitting any feedback or other like acknowledgement signal. In such embodiments, the absence of an acknowledgement signal at the UE 105 may be interpreted to be in a NACK state, and the eNB 110 may retransmit the data transmission. Thus, according to various embodiments, if the eNB 110 does not receive a feedback message within a desired period of time, the eNB 110 may assume that the UE 105 is in a NACK state and the eNB 110 may retransmit the data transmission. If on the other hand, the received signal is decoded correctly, UE 105 may transmit HARQ-ACK signal to the eNB 110. By reducing a number of feedback messages being sent by the UE 105, computational and/or network resources required for opportunistic acknowledgement transmissions may be reduced, which in turn may improve an overall efficiency of the communications system 100.

Referring to FIG. 9, each of tables 1-3 show as examples, a receiver (for example, UE 105) state for an FDD single carrier when using the current LTE specifications for feedback mechanisms in comparison with receiver states for FDD single carrier feedback when using the default NACK state mechanism of various example embodiments. The term "ACK" in each of tables 1-3 signifies a state of the receiver in response to a proper decoding and/or demodulation operation of at least one portion of a data transmission, and the term "NACK" in each of tables 1-3 signifies a state of the receiver in response to an improper decoding and/or demodulation operation of at least one portion of a data transmission. In each of tables 1-3, a value of "1" in a feedback message sent by the receiver may indicate that the receiver is in an ACK state for at least one portion of a data transmission, and a value of "0" in a feedback message sent by the receiver may indicate that the receiver is in a NACK state for at least one portion of a data transmission. Furthermore, in each of tables 1-3, a value of "X" may indicate that no feedback data is sent by the receiver.

Table 1 shows the receiver states for a 1 bit feedback transmission protocol in an FDD deployment, according to an example embodiment. As shown in table 1, for 1 bit feedback transmissions under the current LTE specifications, the receiver may send a feedback message including a bit value of "1" indicating that the receiver is in the ACK state (for example, that the receiver properly decoded and/or demodulated a data transmission), and the receiver may send a feedback message including a bit value of "0" indicating that the receiver is in the NACK state (for example, that the receiver did not properly decoded and/or demodulated a data transmission).

According to the example embodiment of the 1 bit feedback transmission protocol, the receiver may send a feedback message including a bit value of "1" indicating that the receiver is in the ACK state (for example, that the receiver properly decoded and/or demodulated a data transmission), and the receiver does not send a feedback message indicating that the receiver is in the NACK state (for example, that the transmitter assumes that the receiver is in the NACK state). Table 1 also indicates that, by not sending the NACK feedback, 1 bit feedback transmission protocol according to this example embodiment should provide an overhead reduction of approximately 50%.

Table 2 shows the receiver states for a 2 bit feedback transmission protocol, according to a first example embodiment. The example embodiment shown by table 2 may be used for networks employing HARQ with soft combining, wherein incorrectly received coded data blocks may be stored in a buffer at the receiver rather than being discarded by the receiver. In soft combining, when a retransmitted block is received at the receiver, the retransmitted block may be combined with the stored block. As shown in table 2, for 2-bit feedback transmissions under the current LTE-A specifications, the receiver may send a feedback message including a bit value of "1,1" indicating that the receiver is in the ACK state for two portions of a received data transmission (for example, that the receiver properly decoded and/or demodulated two portions of a data transmission); the receiver may send a feedback message including a bit value of "1,0" indicating that the receiver is in the ACK state for a first portion of a received data transmission and a NACK state for a second portion of the data transmission (for example, that the receiver did not properly decode and/or demodulate the second portion of the data transmission and would like the transmitter to retransmit the second portion of the data transmission); the receiver may send a feedback message including a bit value of "0,1" indicating that the receiver is in the NACK state for a first portion of a received data transmission and in the ACK state for a second portion of the data transmission (for example, that the receiver did not properly decode and/or demodulate the first portion of the data transmission and would like the transmitter to retransmit the first portion of the data transmission); and the receiver may send a feedback message including a bit value of "0,0" indicating that the receiver is in the NACK state for a first portion of a received data transmission and in the NACK state the data transmission (for example, that the receiver did not properly decode and/or demodulate the data transmission and would like the transmitter to retransmit the data transmission).

According to the first example embodiment of the 2-bit feedback transmission protocol, the receiver may send a feedback message including a bit value of "1,1" indicating that the receiver is in the ACK state for two portions of a received data transmission (for example, that the receiver properly decode and/or demodulate two portions of a data transmission); the receiver may send a feedback message including a bit value of "1,0" indicating that the receiver is in the ACK state for a first portion of a received data transmission and a NACK state for a second portion of the data transmission (for example, that the receiver did not properly decode and/or demodulate the second portion of the data transmission and would like the transmitter to retransmit the second portion of the data transmission); the receiver may send a feedback message including a bit value of "0,1" indicating that the receiver is in the NACK state for a first portion of a received data transmission and in the ACK state for a second portion of the data transmission (for example, that the receiver did not properly decode and/or demodulate the first portion of the data transmission and would like the transmitter to retransmit the first portion of the data transmission); and the receiver does not send a feedback message indicating that the receiver is in the NACK state (for example, that the transmitter assumes that the receiver is in the NACK state for both portions of the data transmission). Table 2 also indicates that, by not sending the NACK feedback, 2 bit feedback transmission protocol according to the first example embodiment should provide an overhead reduction of approximately 25%.

Table 3 shows the receiver states for a 2-bit feedback transmission protocol, according to a second example embodiment. Table 3 shows the same 2-bit feedback transmissions under the current LTE specifications as described previously with regard to table 2. According to the second example embodiment of the 2-bit feedback transmission protocol, the receiver may send a feedback message including a bit value of "1" indicating that the receiver is in the ACK state for a received data transmission in a same or similar manner as discussed previously with regard to the example embodiment shown by table 1. In contrast to the first example embodiment shown by table 2, the receiver according to the second example embodiment does not send any feedback message when any portion of a data transmission is improperly decoded and/or demodulated, which is indicated by the value "X" in each of the third through fourth rows of the "Receiver Feedback (example embodiment)" column of table 3. Thus, in the second example embodiment, the transmitter assumes that the receiver is in the NACK state whenever any portion of a data transmission is not properly decoded and/or demodulated). Table 3 also indicates that, by not sending the NACK feedback when any portion of a data transmission is improperly decoded and/or demodulated, the 2-bit feedback transmission protocol according to the second example embodiment should provide an overhead reduction of approximately 75%. However, it should be noted that the second example embodiment for the 2-bit feedback transmission protocol may result in more data retransmission by the transmitter.

It should be noted that the example embodiments of FIG. 9 lack an indication of a discontinuous transmission (DTX) state of the receiver. In typical LTE systems, HARQ-ACK feedback may only be transmitted when a UE correctly receives control signaling related to a downlink transmission over a shared channel (for example, DLSCH) intended for the UE on one of the downlink control channels (for example, one of the PDCCHs). If no valid DLSCH related control signaling is detected by the UE, no feedback signal is transmitted to the eNB, which is known as DTX. Therefore, in typical LTE systems, at the eNB, a three state detection of an ACK state, a NACK state, and a DTX state is performed. However, in various embodiments, since no signal will be transmitted when the UE 105 is in both the NACK state and the DTX state, the eNB 110 may not be able to determine whether the UE 105 is in the NACK state or the DTX state. However, similar problem already exists in current LTE specifications in case of PUCCH Format 3 transmission. Accordingly, in various embodiments, a retransmission may occur when the UE 105 is in either the NACK state or the DTX state in a similar fashion as the PUCCH format 3 transmissions.

Figure 10:
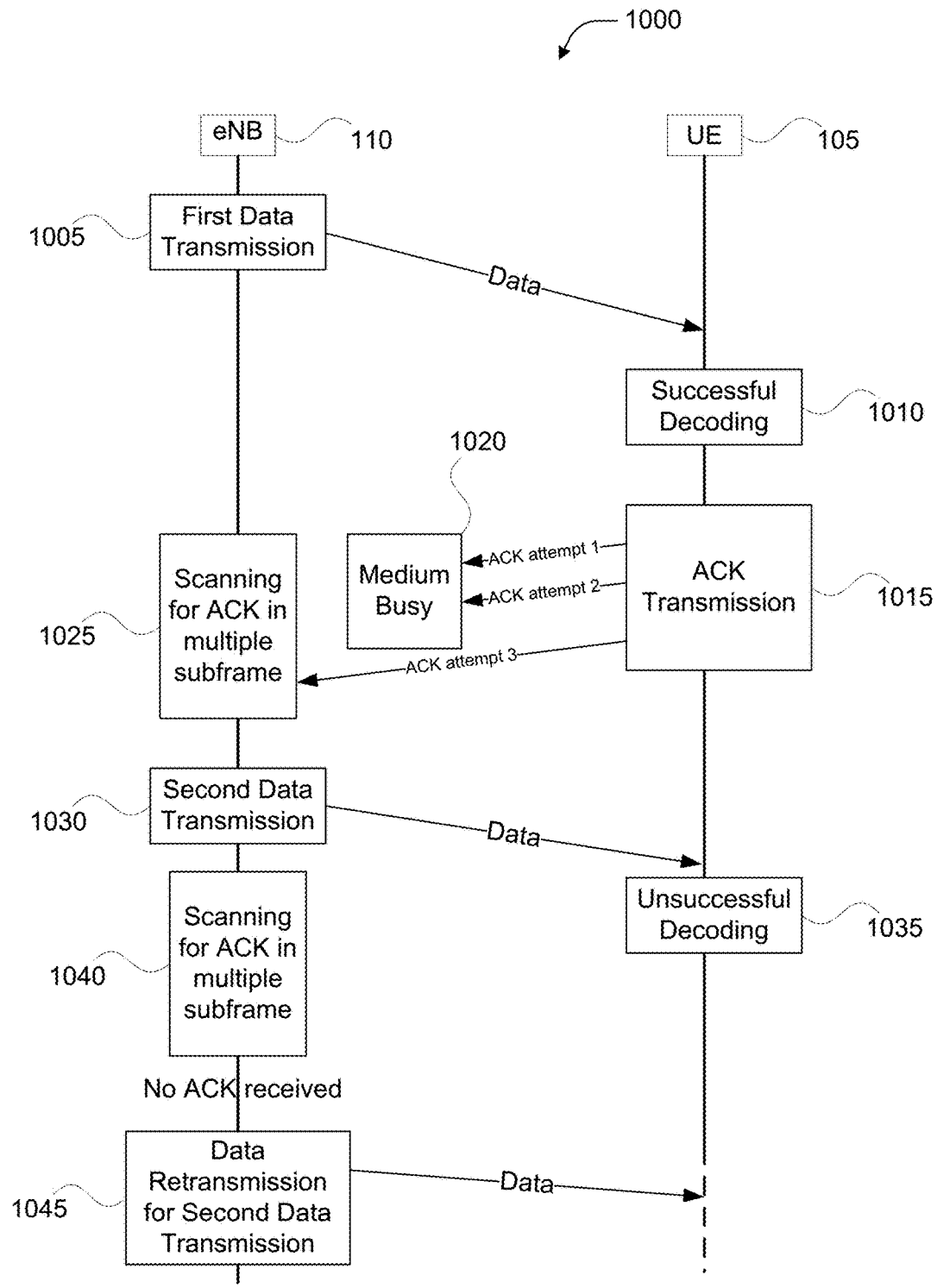
FIG. 10 illustrates a process 1000 that shows the actions taken by the devices of the communications network of FIG. 1, in accordance with various example embodiments.

FIG. 10 illustrates a process 1000 that shows the actions taken by the devices of the communications network of FIG. 1, in accordance with various example embodiments.

As discussed previously, due to the opportunistic nature of HARQ transmissions in the unlicensed spectrum, it may not be possible to transmit feedback transmissions according to a fixed transmission window (for example, on the n+4 subframe or n+k subframe for FDD deployments and TDD deployments, respectively). Additionally, in the default NACK mode example embodiment as previously discussed, if the eNB 110 only scans for feedback transmissions based on a predefined subframe of the fixed transmission window, and the eNB 110 also assumes that a lack of a HARQ-ACK feedback transmission means that the UE 105 is in a NACK state, then the missed opportunity to transmit the feedback on the predefined subframe by the UE 105 may be interpreted as NACK event by the eNB 110, even though the received data transmission may have been properly decoded and/or demodulated by the UE 105. In such instances, the eNB 110 may end up retransmitting the data transmission even though the data retransmission may not be necessary. Accordingly, various example embodiments provide for the combination of the previously discussed flexible transmission window example embodiments with the default NACK mode example embodiments. The combination of these example embodiments may be based on a wireless network operators network design choices. In various embodiments, the UE 105 may transmit the feedback data within a range of subframes, and the eNB 110 may look for the feedback information within the range of subframes. If ACK data is not available within the range of subframes, the eNB 110 may consider the UE 105 to be in a NACK state and retransmit a data transmission.

Referring to FIG. 10, at operation 1005, the eNB 110 transmits a first data transmission to the UE 105. At operation 1010, the UE 105 successfully decodes and/or demodulates the first data transmission. At operation 1015, the UE 105 attempts to transmit HARQ-ACK feedback that is intended for the first data transmission.

In various embodiments, the UE 105 may perform a medium-sensing operation in order to determine whether one of the subframes of the range of subframes is busy or otherwise occupied. In such embodiments, the UE 105 may continue to perform the medium-sensing operations until the UE 105 detects an available subframe. Each time the UE 105 performs a medium-sensing operation may be considered an attempt to transmit feedback data. As shown, the UE 105 attempts to transmit the ACK feedback twice (for example, ACK attempt 1 and ACK attempt 2 as shown) and determines that the medium is busy at operation 1020. In various embodiments, the first attempt may include detecting whether the predefined subframe for the fixed transmission window is available or otherwise unoccupied. If the UE 105 that the predefined subframe is unavailable or occupied, then the UE 105 may scan for available or unoccupied subframes in the unlicensed spectrum according to the example embodiments previously discussed. Furthermore, in some embodiments, the UE may scan for available or unoccupied subframes in an unlicensed spectrum that is different than the unlicensed spectrum used for transmitting the data transmission. Referring back to operation 1015, on the third attempt or third medium-sensing operation (for example, ACK attempt 3 as shown), the UE 105 detects an available subframe of the range of subframes and transmits the ACK feedback on the available subframe.

Meanwhile, at operation 1025 the eNB 110 scans the range of subframes for the ACK transmission that is intended for the first data transmission. Because the UE 105 was able to transmit the ACK feedback on a subframe within the range of subframes, and/or the eNB 110 obtained the ACK feedback within the desired time period for obtaining feedback, at operation 1030 the eNB 110 transmits a second data transmission to the UE 105.

At operation 1035, the UE 105 does not properly decode and/or demodulate the second data transmission, and thus, the UE 105 does not transmit NACK feedback or any other like feedback message or signal for the second data transmission. At operation 1040, the eNB 110 scans for ACK feedback for the second data transmission. Because the UE 105 was unable to transmit the ACK feedback on any of the subframes within the range of subframes, and/or the eNB 110 did not obtain feedback within the desired time period for obtaining feedback, at operation 1045 the eNB 110 retransmits the second data transmission to the UE 105.

The foregoing description of the above implementations provides illustration and description for the example embodiments, but is not intended to be exhaustive or to limit the scope of the invention to the precise form disclosed. Modifications and variations are possible in light of the above teachings and/or may be acquired from practice of various implementations of the invention. For example, the described example embodiments pertain to transmitting feedback in an uplink channel in response to receiving downlink data transmissions in an unlicensed shared medium. However, the example embodiments are may be extended to be applicable to uplink data transmissions and corresponding feedback transmission transmitted in over a downlink channel in an unlicensed shared medium.

EXAMPLES

A first kind of examples may include a method comprising: determining whether a physical channel is empty; and transmitting feedback to a base station in an unlicensed band using the physical channel when the physical channel is empty.

Another example may include the method of any of the preceding first kind of examples, wherein the physical channel comprises a Physical Uplink Control Channel (PUCCH) or a Physical Downlink Control Channel (PDCCH).

Another example may include the method of any of the preceding first kind of examples, wherein the physical channel comprises an available PUCCH channel from an assigned PUCCH channels set according to a consequence of carriers sensing.

Another example may include the method of any of the preceding first kind of examples, wherein the feedback comprises hybrid automatic repeat request (HARQ)-acknowledgment (ACK) using unlicensed shared medium.

Another example may include the method of any of the preceding first kind of examples, wherein the unlicensed band is a same one used for receiving data from the base station, and wherein the feedback is generated based on the data.

Another example may include the method of any of the preceding first kind of examples, wherein the unlicensed band is different from a band used for receiving data from the base station, and wherein the feedback is generated based on the data.

Another example may include one or more non-transitory computer-readable media comprising instructions to cause an user equipment (UE), upon execution of the instructions by one or more processors of the UE, to perform the method of any of the preceding first kind of examples.

Another example may include an apparatus comprising means to perform the method of any of the preceding first kind of examples.

A second kind of examples may include a method comprising: determining a transmission window; and transmitting feedback for received data to a base station in an unlicensed band within the flexible transmission window.

Another example may include the method of any of the preceding second kind of examples, further comprising defining a first fixed timing relation between the received data and the feedback based on the determined transmission window.

Another example may include the method of the preceding example, further comprising determining an availability of a first predefined feedback resource for the feedback based on the first fixed timing relation.

Another example may include the method of the preceding example, further comprising transmitting the feedback using the first predefined feedback resource for the feedback when the predefined resource if available; determining an availability of a second feedback resource for the feedback based on a second fixed timing relation between the received data and the feedback based on the determined transmission window when the predefined resource is unavailable; and starting a timer.

Another example may include the method of the preceding example, further comprising transmitting the feedback using the second feedback resource when the second feedback resource is available; and discarding the feedback when the timer is expired.

Another example may include the method of the preceding example, wherein the timer is expired when subframes within the transmission window are all transmitted.

Another example may include the method of any of the preceding second kind of examples, wherein the transmission window comprises subframes n+4±l for a frequency-division duplexing (FDD) deployment, and wherein l is an integer number.

Another example may include the method of any of the preceding second kind of examples, wherein the transmission window comprises subframes n+k±l in a time-division duplexing (TDD) deployment, and wherein l is an integer number, and k is defined in TS 36.213.

Another example may include the method of any of the preceding second kind of examples, wherein the feedback comprises HARQ-ACK.

Another example may include one or more non-transitory computer-readable media comprising instructions to cause an UE, upon execution of the instructions by one or more processors of the UE, to perform the method of any of the preceding second kind of examples.

Another example may include an apparatus comprising means to perform the method of any of the preceding second kind of examples.

A third kind of examples may include a method comprising: transmitting data to a UE; and detecting feedback for the data within a range of uplink subframes.

Another example may include the method of any of the preceding third kind of examples, wherein the data is transmitted in Physical Downlink Shared Channel (PDSCH) and in an unlicensed band.

Another example may include the method of any of the preceding third kind of examples, wherein the detecting feedback comprises detecting HARQ-ACK/negative acknowledgement (NACK)/discontinuous transmission (DTX) transmitted from within the range of uplink subframes.

Another example may include the method of any of the preceding third kind of examples, wherein the range of uplink subframes comport with a transmission window at the UE for transmitting the feedback.

Another example may include the method of any of the preceding third kind of examples, further comprising reconfiguring semi-static resources for the feedback, wherein the semi-static resources comprises at least one of a carrier index, a band number, and a power control parameter.

Another example may include the method of any of the preceding third kind of examples, further comprising retransmitting the data to the UE when a HARQ-ACK is not received for the data.

Another example may include one or more non-transitory computer-readable media comprising instructions to cause an evolved Node B (eNB), upon execution of the instructions by one or more processors of the eNB, to perform the method of any of the preceding third kind of examples.

Another example may include an apparatus comprising means to perform the method of any of the preceding third kind of examples.

A fourth kind of examples may include a method comprising: multiplexing a plurality of feedback process numbers with feedback for received data; and transmitting the feedback to a base station in an unlicensed band.

Another example may include the method of any of the preceding fourth kind of examples, wherein the feedback process number comprises three bits in a FDD deployment.

Another example may include the method of any of the preceding fourth kind of examples, wherein the feedback process number comprises four bits in a TDD deployment.

Another example may include the method of any of the preceding fourth kind of examples, wherein the multiplexing comprises placing the feedback process number before the feedback.

Another example may include the method of any of the preceding fourth kind of examples, wherein the multiplexing comprises placing the feedback process number after the feedback.

Another example may include the method of any of the preceding fourth kind of examples, wherein the feedback comprises flexible number of ACK/NACK bits.

Another example may include the method of any of the preceding fourth kind of examples, wherein the multiplexing comprises implicit representing the plurality of feedback process numbers using a predetermined ACK/NACK positions based on a predetermined order of the plurality of feedback process numbers.

Another example may include the method of any of the preceding fourth kind of examples, wherein the transmitting comprises transmitting in a PUSCH or PUCCH.

Another example may include the method of any of the preceding fourth kind of examples, wherein the feedback comprises HARQ-ACK.

Another example may include one or more non-transitory computer-readable media comprising instructions to cause an UE, upon execution of the instructions by one or more processors of the UE, to perform the method of any of the preceding fourth kind of examples.

Another example may include an apparatus comprising means to perform the method of any of the preceding fourth kind of examples.

A fifth kind of examples may include an eNB, comprising: transmitter circuitry to receive feedback from a UE; and processing circuitry to match the feedback to a respective PDSCH based on a feedback process number associated with the feedback.

Another example may include the eNB of any of the preceding fifth kind of examples, wherein the feedback process number comprises three bits in a FDD deployment, and wherein the feedback process number comprises four bits in a TDD deployment.

Another example may include the eNB of any of the preceding fifth kind of examples, wherein the respective PDSCH is determined based on the feedback process number before bits of the feedback.

Another example may include the eNB of any of the preceding fifth kind of examples, wherein the respective PDSCH is determined based on the feedback process number after bits of the feedback.

Another example may include the eNB of any of the preceding fifth kind of examples, wherein the respective PDSCH is determined based on a predetermined ACK/NACK positions based on a predetermined order of a plurality of feedback process numbers.

Another example may include the eNB of any of the preceding fifth kind of examples, wherein the feedback comprises a flexible number of ACK/NACK bits.

A sixth kind of examples may include a method comprising: shifting a PUCCH region of one or more subframes to a different resource block (RB) position or PUCCH resource index with an added offset; and transmitting a delayed HARQ-ACK feedback on the one or more subframes in an unlicensed band to a base station.

Another example may include the method of any of the preceding sixth kind of examples, further comprising signaling the added offset to the base station using a higher layer signaling.

Another example may include one or more non-transitory computer-readable media comprising instructions to cause an UE, upon execution of the instructions by one or more processors of the UE, to perform the method of any of the preceding sixth kind of examples.

Another example may include an apparatus comprising means to perform the method of any of the preceding sixth kind of examples.

A seventh kind of examples may include a method comprising: receiving signal from a base station; transmitting a feedback signal in an unlicensed band to the base station only in a default feedback state.

Another example may include the method of any of the preceding seventh kind of examples, further comprising entering the default feedback state when the received signal is decoded correctly; and leaving the default feedback state when the received signal is decoded incorrectly.

Another example may include the method of any of the preceding seventh kind of examples, further comprising entering the default feedback state when the received signal is decoded incorrectly; and leaving the default feedback state when the received signal is decoded correctly.

Another example may include the method of any of the preceding seventh kind of examples, wherein the default feedback state is a default ACK or NACK state.

Another example may include one or more non-transitory computer-readable media comprising instructions to cause an UE, upon execution of the instructions by one or more processors of the UE, to perform the method of any of the preceding seventh kind of examples.

Another example may include an apparatus comprising means to perform the method of any of the preceding seventh kind of examples.

An eighth kind of examples may include the method of any of the preceding second, fourth, sixth, or seventh kind of examples for transmitting the feedback to the base station in the unlicensed band.

Another example may include one or more non-transitory computer-readable media comprising instructions to cause an UE, upon execution of the instructions by one or more processors of the UE, to perform the method of any of the eighth kind of examples.

Another example may include an apparatus comprising means to perform the method of any of the eighth kind of examples.

Another example may include a method of communicating in a wireless network as shown and described herein.

Another example may include a system for providing wireless communication as shown and described herein.

Another example may include a device for providing wireless communication as shown and described herein.

A ninth kind of examples may include an apparatus comprising: radio control circuitry that demodulates and decodes a data transmission from an evolved node B (eNB); and processing circuitry, coupled with the radio control circuitry, that receives the data transmission from the radio control circuitry; and generate feedback based on the data transmission. The radio control circuitry may further control radio-frequency circuitry to determine whether a physical channel in an unlicensed shared medium is unoccupied, and transmit the feedback to the eNB over the physical channel when the physical channel is unoccupied according to the determination.

Another example may include the apparatus of any of the preceding ninth kind of examples, wherein the physical channel is a Physical Uplink Control Channel (PUCCH) or a Physical Uplink Shared Channel (PUSCH)

Another example may include the apparatus of any of the preceding ninth kind of examples, wherein the processing circuitry is to determine whether the received data transmission is properly demodulated and decoded; and the radio control circuitry is to control the radio-frequency circuitry to transmit the feedback when the processing circuit determines that the received data transmission has been properly demodulated and decoded, and the radio control circuitry is to control the radio-frequency circuitry to not transmit the feedback when the processing circuit determines that the received data transmission has not been properly demodulated and decoded.

Another example may include the apparatus of any of the preceding ninth kind of examples, wherein the processing circuitry is to determine a transmission window based on a fixed timing relation when a first subframe of the plurality of subframes is determined to be unoccupied, the fixed timing relation being a predefined transmit time for transmitting the feedback according to a reception time of the received data transmission; the processing circuitry is to select the first subframe when the first subframe is determined to be unoccupied, expand the transmission window when the first subframe is determined to be occupied, and select the second subframe of the plurality of subframes that is within the expanded transmission window for transmitting the feedback; and the radio control circuitry is to control the radio-frequency circuitry to transmit the feedback over the selected one of the first subframe and the second subframe during the transmission window.

Another example may include the apparatus of any of the preceding ninth kind of examples, wherein the processing circuitry is to determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the apparatus of any of the preceding ninth kind of examples, wherein the processing circuitry is to start a timer in response to the determination that the first subframe is occupied, wherein a value of the timer may be based on a size of the expanded transmission window, determine whether the second subframe is unoccupied, and discard the feedback when the timer is expired and when the second subframe is determined to be occupied.

Another example may include the apparatus of any of the preceding ninth kind of examples, wherein the processing circuitry is to shift a first resource block (RB) position of a first subframe of the physical channel for transmitting the feedback to a second RB position of a second subframe of the physical channel based on a determination made by the processing circuitry that the first subframe is occupied; and the radio control circuitry is to control radio-frequency circuitry to transmit the feedback for the received data transmission on the second RB position of the second subframe with another feedback for another data transmission in a first RB position of the second subframe.

Another example may include the apparatus of any of the preceding ninth kind of examples, wherein the processing circuitry is to shift the first RB position of the first subframe to the second RB position of the second subframe according to a resource offset, and the radio control circuitry is to control the radio-frequency circuitry to transmit the resource offset to the eNB using a higher layer signaling than a signaling used for the transmission of the feedback.

Another example may include the apparatus of any of the preceding ninth kind of examples, wherein the processing circuitry is to multiplex the feedback with feedback process numbers such that the radio control circuitry may control the radio-frequency circuitry to transmit the feedback process numbers with the feedback, and wherein to multiplex the feedback with the feedback process numbers, the processing circuitry may place the feedback process numbers after feedback bits of the feedback or before the feedback bits of feedback of the feedback.

A tenth kind of examples may include at least one non-transitory, computer-readable medium including instructions that cause a computing device, in response to execution of the instructions by the computing device, to: demodulate and decode a data transmission received from an evolved node B (eNB); generate feedback based on whether the data transmission is one of properly demodulated and decoded or not properly demodulated and decoded; determine whether a physical channel in an unlicensed shared medium is unoccupied; and transmit the feedback to the eNB over the physical channel when the physical channel is unoccupied according to the determination, wherein the unlicensed shared medium may be a same unlicensed shared medium used for receiving the data transmission from the eNB or a different unlicensed shared medium than the unlicensed shared medium used for receiving the data transmission from the eNB.

Another example may include the at least one non-transitory, computer-readable medium of any of the preceding tenth kind of examples, wherein the physical channel is a Physical Uplink Control Channel (PUCCH) or a Physical Uplink Shared Channel (PUSCH).

Another example may include the at least one non-transitory, computer-readable medium of any of the preceding tenth kind of examples, wherein the instructions cause the computing device, in response to execution of the instructions by the computing device, to: determine whether the received data transmission is properly demodulated and decoded; and transmit the feedback only when the data transmission is determined to have been properly demodulated and decoded.

Another example may include the at least one non-transitory, computer-readable medium of any of the preceding tenth kind of examples, wherein the instructions cause the computing device, in response to execution of the instructions by the computing device, to determine a transmission window based on a fixed timing relation when a first subframe of the plurality of subframes is determined to be unoccupied, the fixed timing relation being a predefined transmit time for transmitting the feedback according to a reception time of the received data transmission; select the first subframe when the first subframe is determined to be unoccupied; expand the transmission window when the first subframe is determined to be occupied; select the second subframe of the plurality of subframes that is within the expanded transmission window for transmitting the feedback; and transmit the feedback over the selected one of the first subframe and the second subframe during the transmission window.

Another example may include the at least one non-transitory, computer-readable medium of any of the preceding tenth kind of examples, wherein the instructions cause the mobile device, in response to execution of the instructions by the mobile device, to: determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the at least one non-transitory, computer-readable medium of any of the preceding tenth kind of examples, wherein the instructions cause the computing device, in response to execution of the instructions by the computing device, to: start a timer in response to the determination that the first subframe is occupied, wherein a value of the timer is based on a size of the expanded transmission window; determine whether the second subframe is unoccupied; and discard the feedback when the timer is expired and when the second subframe is determined to be occupied.

Another example may include the at least one non-transitory, computer-readable medium of any of the preceding tenth kind of examples, wherein the instructions cause the computing device, in response to execution of the instructions by the computing device, to: shift a first resource block (RB) position of a first subframe of the physical channel for transmitting the feedback to a second RB position of a second subframe of the physical channel based on a determination that the first subframe is occupied; and transmit the feedback for the received data transmission on the second RB position of the second subframe with another feedback for another data transmission in a first RB position of the second subframe.

Another example may include the at least one non-transitory, computer-readable medium of any of the preceding tenth kind of examples, wherein the instructions cause the computing device, in response to execution of the instructions by the computing device, to: shift the first RB position of the first subframe to the second RB position of the second subframe according to a resource offset; and transmit the resource offset to the eNB using a higher layer signaling than a signaling used for the transmission of the feedback.

Another example may include the at least one non-transitory, computer-readable medium of any of the preceding tenth kind of examples, wherein the instructions cause the computing device, in response to execution of the instructions by the computing device, to multiplex the feedback with feedback process numbers such that the feedback process numbers are transmitted with the feedback, wherein to multiplex the feedback with the feedback process numbers, is to place the feedback process numbers after feedback bits of the feedback or before the feedback bits of feedback of the feedback.

An eleventh kind of examples may include evolved Node B (eNB) circuitry, comprising: radio control circuitry to control radio-frequency circuitry to receive acknowledgment feedback from a user equipment (UE) over an uplink physical channel in an unlicensed shared medium; and processing circuitry, coupled with the radio control circuitry, that may match the acknowledgment feedback to a corresponding one of a plurality of downlink channels in the unlicensed shared medium based on feedback process numbers included with the feedback, wherein the radio control circuitry is further to control the radio-frequency circuitry to determine whether a downlink physical channel in the unlicensed shared medium is unoccupied, and control the radio-frequency circuitry to transmit a data transmission to the UE over the physical channel when the downlink physical channel is unoccupied according to the determination.

Another example may include the eNB circuitry of any of the preceding eleventh kind of examples, wherein the radio control circuitry may control the radio-frequency circuitry to detect the feedback within a desired range of uplink subframes, to receive the feedback.

Another example may include the eNB of any of the preceding eleventh kind of examples, wherein the uplink physical channel may be one of a Physical Uplink Control Channel (PUCCH) and a Physical Uplink Shared Channel (PUSCH).

Another example may include the eNB circuitry of any of the preceding eleventh kind of examples, wherein the feedback process numbers may comprise three bits in a frequency-division duplexing (FDD) deployment and the feedback process numbers may comprise four bits in a time-division duplexing (TDD) deployment.

Another example may include the eNB circuitry of any of the preceding eleventh kind of examples, wherein the feedback may comprise feedback bits and feedback process numbers. The feedback process numbers may be placed before the feedback bits or after the feedback bits, and the corresponding one of the plurality of downlink channels may be determined based on the feedback process numbers.

Another example may include the eNB circuitry of any of the preceding eleventh kind of examples, wherein the corresponding one of the plurality of downlink channels may be determined based on a defined feedback bit position for each of the feedback bits based on a predetermined order for the feedback process numbers.

Another example may include the eNB circuitry of any of the preceding eleventh kind of examples, wherein the feedback may comprise a flexible number of feedback bits such that the feedback includes a different number of feedback bits than a number of feedback bits of another feedback.

A twelfth kind of examples may include a computer-implemented method for providing feedback for data transmissions in an unlicensed shared medium, the method may comprise: demodulating and decoding a data transmission received from an evolved node B (eNB); generating feedback based on the data transmission; determining whether a physical channel in the unlicensed shared medium is unoccupied; and transmitting the feedback to the eNB over the physical channel when the physical channel is unoccupied according to the determining.

Another example may include the method of any of the preceding twelfth kind of examples, wherein the physical channel may be a Physical Uplink Control Channel (PUCCH) or a Physical Uplink Shared Channel (PUSCH).

Another example may include the method of any of the preceding twelfth kind of examples, may further comprise: determining whether the received data transmission is properly demodulated and decoded; and transmitting the feedback when the processing circuit is to determine that the received data transmission has been properly demodulated and decoded, wherein the feedback may not be transmitted when the processing circuit determines that the received data transmission has not been properly demodulated and decoded.

Another example may include the method of any of the preceding twelfth kind of examples, may further comprise: determining a transmission window based on a fixed timing relation when a first subframe of the plurality of subframes is determined to be unoccupied, the fixed timing relation being a predefined transmit time for transmitting the feedback according to a reception time of the received data transmission; selecting the first subframe when the first subframe is determined to be unoccupied; expanding the transmission window when the first subframe is determined to be occupied; selecting the second subframe of the plurality of subframes that is within the expanded transmission window for transmitting the feedback; and transmitting the feedback over the selected one of the first subframe and the second subframe during the transmission window.

Another example may include the method of any of the preceding twelfth kind of examples, further comprising: determining the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the method of any of the preceding twelfth kind of examples, further comprising: starting a timer in response to the determination that the first subframe is occupied, wherein a value of the timer is based on a size of the expanded transmission window; determining whether the second subframe is unoccupied; and discarding the feedback when the timer is expired and when the second subframe is determined to be occupied.

Another example may include the method of any of the preceding twelfth kind of examples, further comprising: shifting a first resource block (RB) position of a first subframe of the physical channel for transmitting the feedback to a second RB position of a second subframe of the physical channel based on a determination made by the processing circuitry that the first subframe is occupied; and transmitting the feedback for the received data transmission on the second RB position of the second subframe with another feedback for another data transmission in a first RB position of the second subframe.

Another example may include the method of any of the preceding twelfth kind of examples, further comprising: shifting the first RB position of the first subframe to the second RB position of the second subframe according to a resource offset, and transmitting the resource offset to the eNB using a higher layer signaling than a signaling used for the transmission of the feedback.

Another example may include the method of any of the preceding twelfth kind of examples, further comprising: multiplexing the feedback with feedback process numbers, wherein the multiplexing includes placing the feedback process numbers after feedback bits of the feedback or before the feedback bits of feedback of the feedback; and transmitting the feedback process numbers with the feedback.

Another example may include at least one non-transitory, computer-readable medium including instructions to cause a computing device, in response to execution of the instructions by the computing device, to perform the method of any of the preceding twelfth kind of examples.

A thirteenth kind of examples may include a computer-implemented method for providing feedback for data transmissions in an unlicensed shared medium, the method comprising: demodulating and decoding a data transmission received from an evolved node B (eNB); generate feedback based on whether the data transmission is one of properly demodulated and decoded or not properly demodulated and decoded; determining whether a physical channel in the unlicensed shared medium is unoccupied; and transmitting the feedback to the eNB over the physical channel when the physical channel is unoccupied according to the determining, wherein the unlicensed shared medium is one of a same unlicensed shared medium used for receiving the data transmission from the eNB or a different unlicensed shared medium than the unlicensed shared medium used for receiving the data transmission from the eNB.

Another example may include the method of any of the preceding thirteenth kind of examples, wherein the physical channel is a Physical Uplink Control Channel (PUCCH) or a Physical Uplink Shared Channel (PUSCH).

Another example may include the method of any of the preceding thirteenth kind of examples, further comprising: determining whether the received data transmission is properly demodulated and decoded; and transmitting the feedback only when the data transmission is determined to have been properly demodulated and decoded.

Another example may include the method of any of the preceding thirteenth kind of examples, further comprising: determining a transmission window based on a fixed timing relation when a first subframe of the plurality of subframes is determined to be unoccupied, the fixed timing relation being a predefined transmit time for transmitting the feedback according to a reception time of the received data transmission; selecting the first subframe when the first subframe is determined to be unoccupied; expanding the transmission window when the first subframe is determined to be occupied; selecting the second subframe of the plurality of subframes that is within the expanded transmission window for transmitting the feedback; and transmitting the feedback over the selected one of the first subframe and the second subframe during the transmission window.

Another example may include the method of any of the preceding thirteenth kind of examples, further comprising: determining the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the method of any of the preceding thirteenth kind of examples, further comprising: starting a timer in response to the determination that the first subframe is occupied, wherein a value of the timer is based on a size of the expanded transmission window; determining whether the second subframe is unoccupied; and discarding the feedback when the timer is expired and when the second subframe is determined to be occupied.

Another example may include the method of any of the preceding thirteenth kind of examples, further comprising: shifting a first resource block (RB) position of a first subframe of the physical channel for transmitting the feedback to a second RB position of a second subframe of the physical channel based on a determination that the first subframe is occupied; and transmitting the feedback for the received data transmission on the second RB position of the second subframe with another feedback for another data transmission in a first RB position of the second subframe.

Another example may include the method of any of the preceding thirteenth kind of examples, further comprising: shifting the first RB position of the first subframe to the second RB position of the second subframe according to a resource offset; and transmitting the resource offset to the eNB using a higher layer signaling than a signaling used for the transmission of the feedback.

Another example may include the method of any of the preceding thirteenth kind of examples, further comprising: multiplexing the feedback with feedback process numbers such that the feedback process numbers are transmitted with the feedback, wherein the multiplexing includes placing the feedback process numbers after feedback bits of the feedback or before the feedback bits of feedback of the feedback.

Another example may include at least one non-transitory, computer-readable medium including instructions to cause a computing device, in response to execution of the instructions by the computing device, to perform the method of any of the preceding thirteenth kind of examples.

A fourteenth kind of examples may include a method for obtaining feedback for data transmissions in an unlicensed shared medium, the method comprising: receiving acknowledgment feedback from a user equipment (UE) over an uplink physical channel in an unlicensed shared medium; matching the acknowledgment feedback to a corresponding one of a plurality of downlink channels in the unlicensed shared medium based on feedback process numbers included with the feedback; determining whether a downlink physical channel in the unlicensed shared medium is unoccupied; and transmitting a data transmission to the UE over the physical channel when the downlink physical channel is unoccupied according to the determining.

Another example may include the method of any of the preceding fourteenth kind of examples, wherein the receiving comprising: detecting the feedback within a desired range of uplink subframes.

Another example may include the method of any of the preceding fourteenth kind of examples, wherein the uplink physical channel is one of a Physical Uplink Control Channel (PUCCH) and a Physical Uplink Shared Channel (PUSCH).

Another example may include the method of any of the preceding fourteenth kind of examples, wherein the feedback process numbers comprise three bits in a frequency-division duplexing (FDD) deployment and the feedback process numbers comprise four bits in a time-division duplexing (TDD) deployment.

Another example may include the method of any of the preceding fourteenth kind of examples, wherein the feedback comprises feedback bits and feedback process numbers, the feedback process numbers being placed before the feedback bits or after the feedback bits, and the corresponding one of the plurality of downlink channels is determined based on the feedback process numbers.

Another example may include the method of any of the preceding fourteenth kind of examples, wherein the corresponding one of the plurality of downlink channels is determined based on a defined feedback bit position for each of the feedback bits based on a predetermined order for the feedback process numbers.

Another example may include the method of any of the preceding fourteenth kind of examples, wherein the feedback comprises a flexible number of feedback bits such that the feedback includes a different number of feedback bits than a number of feedback bits of another feedback.

Another example may include at least one non-transitory, computer-readable medium including instructions to cause a computing device, in response to execution of the instructions by the computing device, to perform the method of any of the preceding fourteenth kind of examples.

A fifteenth kind of examples may include an apparatus comprising: radio control means to demodulate and decode a data transmission from an evolved node B (eNB); and processing means, coupled with the radio control means, the processing means is to: receive the data transmission from the radio control means; and generate feedback based on the data transmission, wherein the radio control means is further to control radio-frequency means to determine whether a physical channel in an unlicensed shared medium is unoccupied, and transmit the feedback to the eNB over the physical channel when the physical channel is unoccupied according to the determination.

Another example may include the apparatus of any of the preceding fifteenth kind of examples, wherein the physical channel is a Physical Uplink Control Channel (PUCCH) or a Physical Uplink Shared Channel (PUSCH).

Another example may include the apparatus of any of the preceding fifteenth kind of examples, wherein the processing means is to determine whether the received data transmission is properly demodulated and decoded; and the radio control means is to control the radio-frequency means to transmit the feedback when the processing circuit determines that the received data transmission has been properly demodulated and decoded, and not transmit the feedback when the processing circuit determines that the received data transmission has not been properly demodulated and decoded.

Another example may include the apparatus of any of the preceding fifteenth kind of examples, wherein the processing means is to determine a transmission window based on a fixed timing relation when a first subframe of the plurality of subframes is determined to be unoccupied, the fixed timing relation being a predefined transmit time for transmitting the feedback according to a reception time of the received data transmission; the processing means is to select the first subframe when the first subframe is determined to be unoccupied, expand the transmission window when the first subframe is determined to be occupied, and select the second subframe of the plurality of subframes that is within the expanded transmission window for transmitting the feedback; and the radio control means is to control the radio-frequency means to transmit the feedback over the selected one of the first subframe and the second subframe during the transmission window.

Another example may include the apparatus of any of the preceding fifteenth kind of examples, wherein the processing means is to determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the apparatus of any of the preceding fifteenth kind of examples, wherein the processing means is to start a timer in response to the determination that the first subframe is occupied, wherein a value of the timer is based on a size of the expanded transmission window, determine whether the second subframe is unoccupied, and discard the feedback when the timer is expired and when the second subframe is determined to be occupied.

Another example may include the apparatus of any of the preceding fifteenth kind of examples, wherein the processing means is to shift a first resource block (RB) position of a first subframe of the physical channel for transmitting the feedback to a second RB position of a second subframe of the physical channel based on a determination made by the processing means that the first subframe is occupied; and the radio control means is to control radio-frequency means to transmit the feedback for the received data transmission on the second RB position of the second subframe with another feedback for another data transmission in a first RB position of the second subframe.

Another example may include the apparatus of any of the preceding fifteenth kind of examples, wherein the processing means is to shift the first RB position of the first subframe to the second RB position of the second subframe according to a resource offset, and the radio control means is to control the radio-frequency means to transmit the resource offset to the eNB using a higher layer signaling than a signaling used for the transmission of the feedback.

Another example may include the apparatus of any of the preceding fifteenth kind of examples, wherein the processing means is to multiplex the feedback with feedback process numbers such that the radio control means is to control the radio-frequency means to transmit the feedback process numbers with the feedback, and wherein to multiplex the feedback with the feedback process numbers, the processing means is to place the feedback process numbers after feedback bits of the feedback or before the feedback bits of feedback of the feedback.

A sixteenth kind of examples may include an apparatus comprising: means to demodulate and decode a data transmission received from an evolved node B (eNB); means to generate feedback based on whether the data transmission is one of properly demodulated and decoded or not properly demodulated and decoded; means to determine whether a physical channel in an unlicensed shared medium is unoccupied; and means to transmit the feedback to the eNB over the physical channel when the physical channel is unoccupied according to the determination, wherein the unlicensed shared medium is one of a same unlicensed shared medium used for receiving the data transmission from the eNB or a different unlicensed shared medium than the unlicensed shared medium used for receiving the data transmission from the eNB.

Another example may include the apparatus of any of the preceding sixteenth kind of examples, wherein the physical channel is a Physical Uplink Control Channel (PUCCH) or a Physical Uplink Shared Channel (PUSCH).

Another example may include the apparatus of any of the preceding sixteenth kind of examples, further comprising: means to determine whether the received data transmission is properly demodulated and decoded; and the means to transmit the feedback only transmits the feedback when the data transmission is determined to have been properly demodulated and decoded.

Another example may include the apparatus of any of the preceding sixteenth kind of examples, further comprising: means to determine a transmission window based on a fixed timing relation when a first subframe of the plurality of subframes is determined to be unoccupied, the fixed timing relation being a predefined transmit time for transmitting the feedback according to a reception time of the received data transmission; means to select the first subframe when the first subframe is determined to be unoccupied; means to expand the transmission window when the first subframe is determined to be occupied; means to select the second subframe of the plurality of subframes that is within the expanded transmission window for transmitting the feedback; and means to transmit the feedback over the selected one of the first subframe and the second subframe during the transmission window.

Another example may include the apparatus of any of the preceding sixteenth kind of examples, wherein the means to determine whether a physical channel in an unlicensed shared medium is unoccupied comprises: means to determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the apparatus of any of the preceding sixteenth kind of examples, further comprising: means to start a timer in response to the determination that the first subframe is occupied, wherein a value of the timer is based on a size of the expanded transmission window; means to determine whether the second subframe is unoccupied; and means to discard the feedback when the timer is expired and when the second subframe is determined to be occupied.

Another example may include the apparatus of any of the preceding sixteenth kind of examples, further comprising: means to shift a first resource block (RB) position of a first subframe of the physical channel for transmitting the feedback to a second RB position of a second subframe of the physical channel based on a determination that the first subframe is occupied; and means to transmit the feedback for the received data transmission on the second RB position of the second subframe with another feedback for another data transmission in a first RB position of the second subframe.

Another example may include the apparatus of any of the preceding sixteenth kind of examples, further comprising: means to shift the first RB position of the first subframe to the second RB position of the second subframe according to a resource offset; and means to transmit the resource offset to the eNB using a higher layer signaling than a signaling used for the transmission of the feedback.

Another example may include the apparatus of any of the preceding sixteenth kind of examples, further comprising: means to multiplex the feedback with feedback process numbers such that the means to transmit the feedback transmits the feedback process numbers with the feedback, wherein to multiplex the feedback with the feedback process numbers, is to place the feedback process numbers after feedback bits of the feedback or before the feedback bits of feedback of the feedback.

A seventeenth kind of examples may include an evolved Node B (eNB) circuitry comprising: radio control means to control radio-frequency circuitry to receive acknowledgment feedback from a user equipment (UE) over an uplink physical channel in an unlicensed shared medium; and processing means, coupled with the radio control means, the processing means to match the acknowledgment feedback to a corresponding one of a plurality of downlink channels in the unlicensed shared medium based on feedback process numbers included with the feedback, wherein the radio control means is further to control the radio-frequency means to determine whether a downlink physical channel in the unlicensed shared medium is unoccupied, and control the radio-frequency circuitry to transmit a data transmission to the UE over the physical channel when the downlink physical channel is unoccupied according to the determination.

Another example may include the eNB circuitry of any of the preceding seventeenth kind of examples, wherein the radio control means is to control the radio-frequency circuitry to detect the feedback within a desired range of uplink subframes, to receive the feedback.

Another example may include the eNB circuitry of any of the preceding seventeenth kind of examples, wherein the uplink physical channel is one of a Physical Uplink Control Channel (PUCCH) and a Physical Uplink Shared Channel (PUSCH).

Another example may include the eNB circuitry of any of the preceding seventeenth kind of examples, wherein the feedback process numbers comprise three bits in a frequency-division duplexing (FDD) deployment and the feedback process numbers comprise four bits in a time-division duplexing (TDD) deployment.

Another example may include the eNB circuitry of any of the preceding seventeenth kind of examples, wherein the feedback comprises feedback bits and feedback process numbers, the feedback process numbers being placed before the feedback bits or after the feedback bits, and the corresponding one of the plurality of downlink channels is determined based on the feedback process numbers.

Another example may include the eNB circuitry of any of the preceding seventeenth kind of examples, wherein the corresponding one of the plurality of downlink channels is determined based on a defined feedback bit position for each of the feedback bits based on a predetermined order for the feedback process numbers.

Another example may include the eNB circuitry of any of the preceding seventeenth kind of examples, wherein the feedback comprises a flexible number of feedback bits such that the feedback includes a different number of feedback bits than a number of feedback bits of another feedback.

An eighteenth kind of examples may include wireless communications system comprising: at least on user equipment (UE) and at least one evolved Node B (eNB). The UE comprising: UE radio control circuitry to demodulate and decode a data transmission from an evolved node B (eNB); and UE processing circuitry, coupled with the radio control circuitry, the processing circuitry to: receive the data transmission from the radio control circuitry; and generate feedback based on the data transmission, wherein the UE radio control circuitry is further to control UE radio-frequency circuitry to determine whether an uplink physical channel in an unlicensed shared medium is unoccupied, and transmit the feedback to the eNB over the uplink physical channel when the uplink physical channel is determined to be unoccupied. The eNB includes eNB circuitry comprising: eNB radio control circuitry to control eNB radio-frequency circuitry to receive the feedback from the UE over the uplink physical channel in the unlicensed shared medium; and eNB processing circuitry, coupled with the eNB radio control circuitry, the eNB processing circuitry to match the feedback to a corresponding one of a plurality of downlink channels in the unlicensed shared medium based on feedback process numbers included with the feedback, wherein the eNB radio control circuitry is further to control the eNB radio-frequency circuitry to determine whether a downlink physical channel in the unlicensed shared medium is unoccupied, and control the eNB radio-frequency circuitry to transmit a data transmission to the UE over the physical channel when the downlink physical channel is determined to be unoccupied.

Another example may include the system of any of the preceding eighteenth kind of examples, wherein the uplink physical channel is a Physical Uplink Control Channel (PUCCH) or a Physical Uplink Shared Channel (PUSCH).

Another example may include the system of any of the preceding eighteenth kind of examples, wherein the UE processing circuitry is to determine whether the received data transmission is properly demodulated and decoded; and the UE radio control circuitry is to control the UE radio-frequency circuitry to transmit the feedback when the UE processing circuitry determines that the received data transmission has been properly demodulated and decoded, and not transmit the feedback when the processing circuit determines that the received data transmission has not been properly demodulated and decoded.

Another example may include the system of any of the preceding eighteenth kind of examples, wherein the UE processing circuitry is to determine a transmission window based on a fixed timing relation when a first subframe of the plurality of subframes is determined to be unoccupied, the fixed timing relation being a predefined transmit time for transmitting the feedback according to a reception time of the received data transmission; the UE processing circuitry is to select the first subframe when the first subframe is determined to be unoccupied, expand the transmission window when the first subframe is determined to be occupied, and select the second subframe of the plurality of subframes that is within the expanded transmission window for transmitting the feedback; and the UE radio control circuitry is to control the UE radio-frequency circuitry to transmit the feedback over the selected one of the first subframe and the second subframe during the transmission window.

Another example may include the system of any of the preceding eighteenth kind of examples, wherein the UE processing circuitry is to determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor.

Another example may include the system of any of the preceding eighteenth kind of examples, wherein the UE processing circuitry is to start a timer in response to the determination that the first subframe is occupied, wherein a value of the timer is based on a size of the expanded transmission window, determine whether the second subframe is unoccupied, and discard the feedback when the timer is expired and when the second subframe is determined to be occupied.

Another example may include the system of any of the preceding eighteenth kind of examples, wherein the UE processing circuitry is to shift a first resource block (RB) position of a first subframe of the physical channel for transmitting the feedback to a second RB position of a second subframe of the physical channel based on a determination made by the processing circuitry that the first subframe is occupied; and the UE radio control circuitry is to control UE radio-frequency circuitry to transmit the feedback for the received data transmission on the second RB position of the second subframe with another feedback for another data transmission in a first RB position of the second subframe.

Another example may include the system of any of the preceding eighteenth kind of examples, wherein the UE processing circuitry is to shift the first RB position of the first subframe to the second RB position of the second subframe according to a resource offset, and the UE radio control circuitry is to control the UE radio-frequency circuitry to transmit the resource offset to the eNB using a higher layer signaling than a signaling used for the transmission of the feedback.

Another example may include the system of any of the preceding eighteenth kind of examples, wherein the UE processing circuitry is to multiplex the feedback with feedback process numbers such that the UE radio control circuitry is to control the radio-frequency circuitry to transmit the feedback process numbers with the feedback, and wherein to multiplex the feedback with the feedback process numbers, the UE processing circuitry is to place the feedback process numbers after feedback bits of the feedback or before the feedback bits of feedback of the feedback.

Another example may include the system of any of the preceding eighteenth kind of examples, wherein the eNB radio control circuitry is to control the eNB radio-frequency circuitry to detect the feedback within a desired range of uplink subframes, to receive the feedback.

Another example may include the system of any of the preceding eighteenth kind of examples, wherein the uplink physical channel is one of a Physical Uplink Control Channel (PUCCH) and a Physical Uplink Shared Channel (PUSCH).

Another example may include the system of any of the preceding eighteenth kind of examples, wherein the feedback process numbers comprise three bits in a frequency-division duplexing (FDD) deployment and the feedback process numbers comprise four bits in a time-division duplexing (TDD) deployment.

Another example may include the system of any of the preceding eighteenth kind of examples, wherein the feedback comprises feedback bits and feedback process numbers, the feedback process numbers being placed before the feedback bits or after the feedback bits, and the corresponding one of the plurality of downlink channels is determined based on the feedback process numbers.

Another example may include the system of any of the preceding eighteenth kind of examples, wherein the corresponding one of the plurality of downlink channels is determined based on a defined feedback bit position for each of the feedback bits based on a predetermined order for the feedback process numbers.

Another example may include the system of any of the preceding eighteenth kind of examples, wherein the feedback comprises a flexible number of feedback bits such that the feedback includes a different number of feedback bits than a number of feedback bits of another feedback.

The foregoing description of the above Examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the invention.

What is claimed is:

1. An apparatus comprising:
    radio control circuitry to:
        demodulate and decode a data transmission from an evolved node B (eNB);
        control radio-frequency circuitry to determine whether a physical channel in an unlicensed shared medium is unoccupied, and
        transmit feedback to the eNB over a selected one of a first subframe and a second subframe of a plurality of subframes of the physical channel during a transmission window; and
    processing circuitry, coupled with the radio control circuitry, the processing circuitry to:
        receive the data transmission from the radio control circuitry;
        generate the feedback based on whether the data transmission was properly demodulated and decoded;
        determine a transmission window for transmitting the feedback to the eNB based on a fixed timing relation, wherein the fixed timing relation is a predefined time for transmitting the feedback according to a reception time of the data transmission;
        select the first subframe for transmitting the feedback when the first subframe is determined to be unoccupied;
        expand the transmission window to determine the second subframe when the first subframe is determined to be occupied, wherein to expand the transmission to determine the second subframe, the processing circuitry is to determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor; and select the second subframe that is within the expanded transmission window for transmitting the feedback.

2. The apparatus of claim 1, wherein the physical channel is a Physical Uplink Control Channel (PUCCH) or a Physical Uplink Shared Channel (PUSCH).

3. The apparatus of claim 1, wherein
the processing circuitry is to determine whether the received data transmission is properly demodulated and decoded; and
the radio control circuitry is to control the radio-frequency circuitry to transmit the feedback when the processing circuit determines that the received data transmission has been properly demodulated and decoded, and not transmit the feedback when the processing circuit determines that the received data transmission has not been properly demodulated and decoded.

4. The apparatus of claim 1, wherein the processing circuitry is to start a timer in response to the determination that the first subframe is occupied, wherein a value of the timer is based on a size of the expanded transmission window, determine whether the second subframe is unoccupied, and discard the feedback when the timer is expired and when the second subframe is determined to be occupied.

5. The apparatus of claim 1, wherein
the processing circuitry is to shift a first resource block (RB) position of a first subframe of the physical channel for transmitting the feedback to a second RB position of a second subframe of the physical channel based on a determination made by the processing circuitry that the first subframe is occupied; and
the radio control circuitry is to control the radio-frequency circuitry to transmit the feedback for the received data transmission on the second RB position of the second subframe with another feedback for another data transmission in a first RB position of the second subframe.

6. The apparatus of claim 5, wherein
the processing circuitry is to shift the first RB position of the first subframe to the second RB position of the second subframe according to a resource offset, and
the radio control circuitry is to control the radio-frequency circuitry to transmit the resource offset to the eNB using a higher layer signaling than a signaling used for the transmission of the feedback.

7. The apparatus of claim 1, wherein the processing circuitry is to multiplex the feedback with feedback process numbers such that the radio control circuitry is to control the radio-frequency circuitry to transmit the feedback process numbers with the feedback, and wherein to multiplex the feedback with the feedback process numbers, the processing circuitry is to place the feedback process numbers after feedback bits of the feedback or before the feedback bits of the feedback.

8. At least one non-transitory, computer-readable medium including instructions to cause a computing device, in response to execution of the instructions by the computing device, to:
demodulate and decode a data transmission received from an evolved node B (eNB);
generate feedback based on whether the data transmission is properly demodulated and decoded or not properly demodulated and decoded;
determine whether a physical channel in an unlicensed shared medium is unoccupied, wherein, to determine whether the physical channel in the unlicensed shared medium is unoccupied, the computing device, in response to execution of the instructions, is to:
determine a flexible transmission window for transmitting the feedback based on a fixed transmission window, wherein the fixed transmission window is a predefined period of time for transmitting the feedback according to a receipt time of the data transmission, and
select, within the flexible transmission window, an unoccupied feedback resource of the physical channel in which to transmit the feedback, wherein the unoccupied feedback resource is a subframe of a plurality of subframes, and to select the unoccupied feedback resource, the instructions cause the computing device, in response to execution of the instructions by the computing device, to:
select, as the unoccupied feedback resource, a first subframe of the plurality of subframes when the first subframe is determined to be unoccupied,
expand the flexible transmission window when the first subframe is determined to be occupied, and
select, as the unoccupied feedback resource, a second subframe of the plurality of subframes that is within the expanded flexible transmission window,
wherein, to expand the flexible transmission window, execution of the instructions is to cause the computing device to determine the second subframe according to n+4+l in a frequency-division duplexing (FDD) deployment and n+k+l in a time-division duplexing (TDD) deployment. where n is a subframe number of the first subframe, k is a predefined number, and l is a transmission window expansion factor; and
control transmission of the feedback to the eNB in the selected unoccupied feedback resource of the physical channel during the flexible transmission window,
wherein the unlicensed shared medium is a same unlicensed shared medium used for receiving the data transmission from the eNB or a different unlicensed shared medium than the unlicensed shared medium used for receiving the data transmission from the eNB.

9. The at least one non-transitory, computer-readable medium of claim 8, wherein the physical channel is a Physical Uplink Control Channel (PUCCH) or a Physical Uplink Shared Channel (PUSCH).

10. The at least one non-transitory, computer-readable medium of claim 8, wherein the instructions cause the computing device, in response to execution of the instructions by the computing device, to:
determine whether the received data transmission is properly demodulated and decoded; and
transmit the feedback only when the data transmission is determined to have been properly demodulated and decoded.

11. The at least one non-transitory, computer-readable medium of claim 8, wherein the instructions cause the computing device, in response to execution of the instructions by the computing device, to:

start a timer in response to the determination that the first subframe is occupied, wherein a value of the timer is based on a size of the expanded flexible transmission window;
determine whether the second subframe is unoccupied; and
discard the feedback when the timer is expired and when the second subframe is determined to be occupied.

12. The at least one non-transitory, computer-readable medium of claim 8, wherein the instructions cause the computing device, in response to execution of the instructions by the computing device, to:
shift a first resource block (RB) position of a first subframe of the physical channel for transmitting the feedback to a second RB position of a second subframe of the physical channel based on a determination that the first subframe is occupied; and
transmit the feedback for the received data transmission on the second RB position of the second subframe with another feedback for another data transmission in the first RB position of the second subframe.

13. The at least one non-transitory, computer-readable medium of claim 12, wherein the instructions cause the computing device, in response to execution of the instructions by the computing device, to:
shift the first RB position of the first subframe to the second RB position of the second subframe according to a resource offset; and
transmit the resource offset to the eNB using a higher layer signaling than a signaling used for the transmission of the feedback.

14. The at least one non-transitory, computer-readable medium of claim 8, wherein the instructions cause the computing device, in response to execution of the instructions by the computing device, to:
multiplex the feedback with feedback process numbers such that the feedback process numbers are transmitted with the feedback, wherein to multiplex the feedback with the feedback process numbers is to place the feedback process numbers after feedback bits of the feedback or before the feedback bits of the feedback.

15. Evolved Node B (eNB) circuitry, comprising:
radio control circuitry to control radio-frequency circuitry to:
receive an indication of a range of uplink subframes of an uplink physical channel in an unlicensed shared medium in which to detect feedback from a user equipment (UE),
receive the feedback from the UE within the range of uplink subframes,
control the radio-frequency circuitry to determine whether a downlink physical channel in the unlicensed shared medium is unoccupied, and
control the radio-frequency circuitry to transmit a data transmission to the UE over a selected one of a first subframe and a second subframe of the downlink physical channel during a transmission window when the downlink physical channel is determined to be unoccupied; and
processing circuitry, coupled with the radio control circuitry, the processing circuitry to:
match the acknowledgment feedback to a corresponding one of a plurality of downlink channels in the unlicensed shared medium based on feedback process numbers included with the feedback,
determine a flexible downlink transmission window for transmitting the data transmission to the UE based on a fixed timing relation, wherein the fixed timing relation is a predefined time for transmitting the data transmission according to a reception time of the feedback;
select the first subframe for transmitting the data transmission when the first subframe is determined to be unoccupied;
expand the transmission window to obtain the second subframe when the first subframe is determined to be occupied, wherein, to expand the transmission window to obtain the second subframe, the processing circuitry is to determine the second subframe according to n+4+l in a frequency-division duplexing (FDD) deployment and n+k+l in a time-division duplexing (TDD) deployment, where n is a subframe number of the first subframe, k is a predefined number, and l is a transmission window expansion factor; and
select the second subframe that is within the expanded transmission window for transmitting the data transmission.

16. The eNB circuitry of claim 15, wherein the range of uplink subframes is based on a flexible uplink transmission window, wherein the flexible uplink transmission window is based on a fixed uplink transmission window, wherein the fixed uplink transmission window is a predefined period of time in which the feedback is to be transmitted according to a reception time of another data transmission.

17. The eNB circuitry of claim 15, wherein the uplink physical channel is one of a Physical Uplink Control Channel (PUCCH) and a Physical Uplink Shared Channel (PUSCH), and the downlink physical channel is one of a Physical Downlink Control Channel (PDCCH) and a Physical Downlink Shared Channel (PDSCH).

18. The eNB circuitry of claim 15, wherein the feedback process numbers comprise three bits in a frequency-division duplexing (FDD) deployment and the feedback process numbers comprise four bits in a time-division duplexing (TDD) deployment.

19. The eNB circuitry of claim 15, wherein the feedback comprises feedback bits and feedback process numbers, the feedback process numbers being placed before the feedback bits or after the feedback bits, and the corresponding one of the plurality of downlink channels is determined based on the feedback process numbers.

20. The eNB circuitry of claim 19, wherein the corresponding one of the plurality of downlink channels is determined based on a defined feedback bit position for each of the feedback bits based on a predetermined order for the feedback process numbers.

21. The eNB circuitry of claim 15, wherein the feedback comprises a flexible number of feedback bits such that the feedback includes a different number of feedback bits than a number of feedback bits of another feedback.

* * * * *

UNITED STATES PATENT AND TRADEMARK OFFICE
CERTIFICATE OF CORRECTION

PATENT NO. : 10,158,473 B2
APPLICATION NO. : 14/671872
DATED : December 18, 2018
INVENTOR(S) : Shafi Bashar et al.

Page 1 of 1

It is certified that error appears in the above-identified patent and that said Letters Patent is hereby corrected as shown below:

In the Claims

Column 40, Line 39-40, Claim 8: replace "deployment. where n" with --deployment, where n--.

Signed and Sealed this
Twenty-sixth Day of February, 2019

Andrei Iancu
*Director of the United States Patent and Trademark Office*